US012756864B2

(12) United States Patent
Park et al.

(10) Patent No.: US 12,756,864 B2
(45) Date of Patent: Oct. 6, 2026

(54) POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

(71) Applicant: LG Electronics Inc., Seoul (KR)

(72) Inventors: Yousun Park, Seoul (KR); Hyejung Hur, Seoul (KR); Hyunmook Oh, Seoul (KR); Sooyeon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 18/549,099

(22) PCT Filed: Mar. 4, 2022

(86) PCT No.: PCT/KR2022/003081

§ 371 (c)(1),
(2) Date: Sep. 5, 2023

(87) PCT Pub. No.: WO2022/186651

PCT Pub. Date: Sep. 9, 2022

(65) Prior Publication Data

US 2024/0155157 A1 May 9, 2024

(30) Foreign Application Priority Data

Mar. 4, 2021 (KR) ........................ 10-2021-0028694

(51) Int. Cl.

| | |
|---|---|
| ***H04N 19/597*** | (2014.01) |
| ***G06T 9/40*** | (2006.01) |
| ***H04N 19/132*** | (2014.01) |
| ***H04N 19/136*** | (2014.01) |
| ***H04N 19/184*** | (2014.01) |
| ***H04N 19/70*** | (2014.01) |

(Continued)

(52) U.S. Cl.

CPC ............. *H04N 19/597* (2014.11); *G06T 9/40* (2013.01); *H04N 19/132* (2014.11); *H04N 19/136* (2014.11); *H04N 19/184* (2014.11); *H04N 19/70* (2014.11); *H04N 19/96* (2014.11); *H04N 19/124* (2014.11)

(58) Field of Classification Search

CPC ............. G06T 9/40; G06T 2207/10028; G06T 17/005; G06T 17/00; G06T 3/40; H04N 19/96; H04N 19/132

See application file for complete search history.

(56) References Cited

U.S. PATENT DOCUMENTS

2019/0081638 A1* 3/2019 Mammou ............ H04N 19/436
2019/0116357 A1* 4/2019 Tian ....................... H04N 19/14
2019/0311499 A1* 10/2019 Mammou ................. G06T 7/50

(Continued)

FOREIGN PATENT DOCUMENTS

EP 3926960 B1 * 10/2024 ............... G06T 9/00

*Primary Examiner* — Fabio S Lima
(74) *Attorney, Agent, or Firm* — Fish & Richardson P.C.

(57) ABSTRACT

A point cloud data transmission method according to embodiments may comprise the steps of: encoding geometry information including the positions of points of the point cloud data; encoding, on the basis of the geometry information, attribute information about the points of the point cloud data; and transmitting the encoded geometry information, the encoded attribute information and signaling information.

12 Claims, 39 Drawing Sheets

(51) Int. Cl.
*H04N 19/96* (2014.01)
*H04N 19/124* (2014.01)

(56) References Cited

U.S. PATENT DOCUMENTS

| | | | | |
|---|---|---|---|---|
| 2020/0021844 | A1* | 1/2020 | Yea | H04N 19/124 |
| 2020/0105025 | A1* | 4/2020 | Yea | G06T 15/08 |
| 2020/0296427 | A1* | 9/2020 | Ricard | G06T 9/40 |
| 2020/0302651 | A1* | 9/2020 | Flynn | G06T 9/00 |
| 2020/0304823 | A1* | 9/2020 | Yea | G06T 9/001 |
| 2021/0082153 | A1* | 3/2021 | Sugio | H04N 19/597 |
| 2021/0211734 | A1* | 7/2021 | Ray | G06T 9/001 |
| 2021/0256735 | A1* | 8/2021 | Tourapis | H03M 7/6005 |
| 2021/0400280 | A1* | 12/2021 | Zaghetto | H04N 19/119 |
| 2023/0334715 | A1* | 10/2023 | Unno | H04N 19/90 |
| 2024/0046528 | A1* | 2/2024 | Taquet | G06T 9/004 |
| 2024/0121418 | A1* | 4/2024 | Hur | H04N 21/2393 |
| 2024/0155157 | A1* | 5/2024 | Park | H04N 19/184 |

* cited by examiner

FIG. 15
original
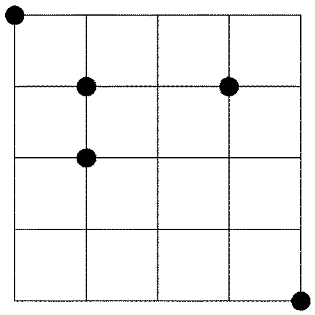
(a)
quatization scale=0.5
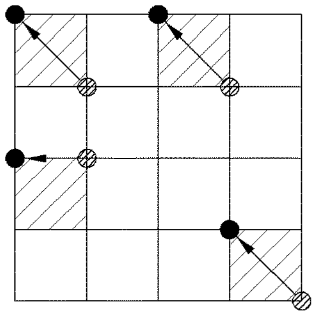
(b)
quatization scale=0.25
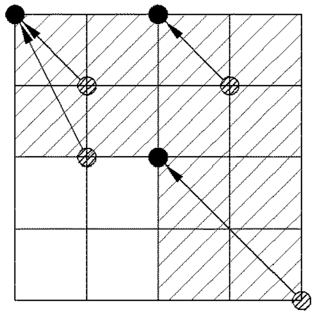
(c)
quatization scale=0.125
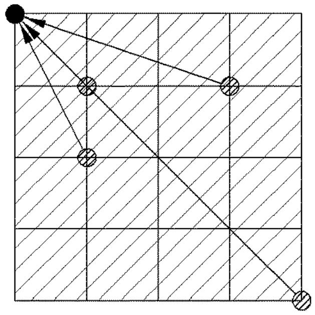
(d)

FIG. 24

| seq_parameter_set( ) { | Descriptor |
|---|---|
| main_profile_compatibility_flag | u(1) |
| unique_point_positions_constraint_flag | u(1) |
| level_idc | u(8) |
| sps_seq_parameter_set_id | ue(v) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_offset_log2_scale | ue(v) |
| sps_bounding_box_size_width | ue(v) |
| sps_bounding_box_size_height | ue(v) |
| sps_bounding_box_size_depth | ue(v) |
| } | |
| sps_source_scale_factor_numerator_minus1 | ue(v) |
| sps_source_scale_factor_denominator_minus1 | ue(v) |
| sps_num_attribute_sets | ue(v) |
| for( i = 0; i< sps_num_attribute_sets; i++ ) { | |
| attribute_dimension_minus1[ i ] | ue(v) |
| attribute_instance_id[ i ] | ue(v) |
| if(attribute_dimension_minus1[ i ] > 0 ) | |
| attribute_secondary_bitdepth_minus1[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| log2_max_frame_idx | u(5) |
| axis_coding_order | u(3) |
| sps_bypass_stream_enabled_flag | u(1) |
| sps_extension _flag | u(1) |
| if( sps_extension _flag ) | |
| while( more_data_in_byte_stream( ) ) | |
| sps_extension_data_flag | u(1) |
| byte_alignment( ) | |
| } | |

FIG. 25

| seq_parameter_set_rbsp( ) { | Descriptor |
|---|---|
| ... | |
| recoloring_skip_flag | u(1) |
| octree_sampling_location | ue(v) |
| sampling_point_num | ue(v) |
| reconstructed_geometry_use_flag | u(1) |
| if(reconstructed_geometry_use_flag) | |
| metadata_data_unit() | ue(v) |
| ... | |
| } | |

FIG. 26

| metadata_data_unit( ) { | Descriptor |
|---|---|
| for(int i = 0; i < sampling_point_num; i++) | |
| octree_sampling_residual[i][3] | ue(v) |
| } | |

FIG. 27

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if ( gps_box_present_flag ){ | |
| gps_gsh_box_log2_scale_present_flag | u(1) |
| if ( gps_gsh_box_log2_scale_present_flag = = 0 ) | |
| gps_gsh_box_log2_scale | ue(v) |
| } | |
| unique_geometry_points_flag | u(1) |
| geometry_planar_mode_flag | u(1) |
| if( geometry_planar_mode_flag ){ | |
| geom_planar_mode_th_idcm | ue(v) |
| geom_planar_mode_th[ 1 ] | ue(v) |
| geom_planar_mode_th[ 2 ] | ue(v) |
| } | |
| geometry_angular_mode_flag | u(1) |
| if ( geometry_angular_mode_flag ){ | |
| lidar_head_position[0] | se(v) |
| lidar_head_position[1] | se(v) |
| lidar_head_position[2] | se(v) |
| number_lasers | ue(v) |
| for( i = 0; i < number_lasers; i++ ) { | |
| laser_angle[ i ] | se(v) |
| laser_correction[ i ] | se(v) |
| } | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if ( geom_scaling_enabled_flag ) | |
| geom_base_qp | ue(v) |
| gps_implicit_geom_partition_flag | u(1) |
| if ( gps_implicit_geom_partition_flag ) { | |
| gps_max_num_implicit_qtbt_before_ot | ue(v) |
| gps_min_size_implicit_qtbt | ue(v) |
| } | |
| gps_extension _flag | u(1) |
| if ( gps_extension _flag ) | |
| while( more_data_in_byte_stream ( ) ) | |
| gps_extension_data_flag | u(1) |
| byte_alignment( ) | |
| } | |

FIG. 28

| geometry_parameter_set( ) { | Descriptor |
|---|---|
| ... | |
| recoloring_skip_flag | u(1) |
| octree_sampling_location | ue(v) |
| sampling_point_num | ue(v) |
| reconstructed_geometry_use_flag | u(1) |
| if(reconstructed_geometry_use_flag) | |
| metadata_data_unit() | ue(v) |
| ... | |
| } | |

FIG. 29

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| } | |
| byte_alignment( ) | |
| } | |

FIG. 30

| tile_parameter_set( ) { | Descriptor |
|---|---|
| ... | |
| recoloring_skip_flag | u(1) |
| octree_sampling_location | ue(v) |
| sampling_point_num | ue(v) |
| reconstructed_geometry_use_flag | u(1) |
| if(reconstructed_geometry_use_flag) | |
| metadata_data_unit() | ue(v) |
| ... | |
| } | |

FIG. 31

| attribute_parameter_set ( ) { | Descriptor |
|---|---|
| aps_attr_parameter_set_id | ue(v) |
| aps_seq_parameter_set_id | ue(v) |
| attr_coding_type | ue(v) |
| aps_attr_initial_qp | ue(v) |
| aps_attr_chroma_qp_offset | se(v) |
| aps_slice_qp_delta_present_flag | u(1) |
| LodParametersPresent = ( attr_coding_type == 0 \|\| attr_coding_type == 2 ) ? 1 : 0 | |
| if ( LodParametersPresent) { | |
| lifting_num_pred_nearest_neighbours_minus1 | ue(v) |
| lifting_search_range_minus1 | ue(v) |
| for ( k = 0; k < 3; k++ ) | |
| lifting_neighbour_bias[ k ] | ue(v) |
| if ( attr_coding_type == 2 ) | |
| lifting_scalability_enabled_flag | u(1) |
| if ( ! lifting_scalability_enabled_flag ) { | |
| lifting_num_detail_levels_minus1<br>[Ed. The V7.0 code use the variable without minus1. It should be aligned] | ue(v) |
| if ( lifting_num_detail_levels_minus1 > 0 ) { | |
| lifting_lod_regular_sampling_enabled_flag | u(1) |
| for ( idx = 0; idx < num_detail_levels_minus1; idx++ ) { | |
| if ( lifting_lod_regular_sampling_enabled_flag ) | |
| lifting_sampling_period_minus2[ idx ] | ue(v) |
| else | |
| lifting_sampling_distance_squared_scale_minus1[ idx ] | ue(v) |
| if ( idx != 0 ) | |
| lifting_sampling_distance_squared_offset[ idx ] | ue(v) |
| } | |
| } | |
| } | |
| if ( attr_coding_type == 0 ) { | |
| lifting_adaptive_prediction_threshold | ue(v) |
| lifting_intra_lod_prediction_num_layers | ue(v) |
| lifting_max_num_direct_predictors | ue(v) |
| inter_component_prediction_enabled_flag | u(1) |
| } | |
| } | |
| if ( attribute_coding_type == 1 ) { //RAHT | |
| raht_prediction_enabled_flag | u(1) |
| if (raht_prediction_enabled_f lag) { | |
| raht_prediction_threshold0 | ue(v) |
| raht_prediction_threshold1 | ue(v) |
| } | |
| } | |
| aps_extension _flag | u(1) |
| if( aps_extension _flag ) | |
| while( more_data_in_byte_stream( ) ) | |
| aps_extension_data_flag | u(1) |
| byte_alignment( ) | |
| } | |

FIG. 32

| attribute_parameter_set( ) { | Descriptor |
|---|---|
| ... | |
| recoloring_skip_flag | u(1) |
| octree_sampling_location | ue(v) |
| sampling_point_num | ue(v) |
| reconstructed_geometry_use_flag | u(1) |
| if(reconstructed_geometry_use_flag) | |
| metadata_data_unit() | ue(v) |
| ... | |
| } | |

FIG. 33

| geometry_slice_bitstream( ) { | Descriptor |
|---|---|
| geometry_slice_header( ) | |
| geometry_slice_data( ) | |
| } | |

FIG. 34

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
| if( gps_gsh_box_log2_scale_present_flag ) | |
| gsh_box_log2_scale | ue(v) |
| gsh_box_origin_x | ue(v) |
| gsh_box_origin_y | ue(v) |
| gsh_box_origin_z | ue(v) |
| } | |
| if ( gps_implicit_geom_partition_flag ) { | |
| gsh_log2_max_nodesize_x | ue(v) |
| gsh_log2_max_nodesize_y_minus_x | se(v) |
| gsh_log2_max_nodesize_z_minus_y | se(v) |
| } else { | |
| gsh_log2_max_nodesize | ue(v) |
| } | |
| if( geom_scaling_enabled_flag ) { | |
| geom_slice_qp_offset | se(v) |
| geom_octree_qp_offsets_enabled_flag | u(1) |
| if( geom_octree_qp_offsets_enabled_flag ) | |
| geom_octree_qp_offsets_depth | ue(v) |
| } | |
| byte_alignment( ) | |
| } | |

FIG. 35

| geometry_slice_header( ) { | Descriptor |
|---|---|
| ... | |
| recoloring_skip_flag | u(1) |
| octree_sampling_location | ue(v) |
| sampling_point_num | ue(v) |
| reconstructed_geometry_use_flag | u(1) |
| if(reconstructed_geometry_use_flag) | |
| metadata_data_unit() | ue(v) |
| ... | |
| } | |

FIG. 36

| attribute_slice_bitstream( ) { | Descriptor |
|---|---|
| attribute_slice_header( ) | |
| attribute_slice_data( ) | |
| } | |

FIG. 37

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_attr_qp_delta_luma | se(v) |
| if( attribute_dimension_minus1[ ash_attr_sps_attr_idx ] > 0 ) | |
| ash_attr_qp_delta_chroma | se(v) |
| } | |
| ash_attr_layer_qp_delta_present_flag | u(1) |
| if ( ash_attr_layer_qp_delta_present_flag ) { | |
| ash_attr_num_layer_qp_minus1 | ue(v) |
| for( i = 0; i < NumLayerQp; i++ ){ | |
| ash_attr_layer_qp_delta_luma[i] | se(v) |
| if( attribute_dimension_minus1[ ash_attr_sps_attr_idx ] > 0 ) | |
| ash_attr_layer_qp_delta_chroma[i] | se(v) |
| } | |
| } | |
| ash_attr_region_qp_delta_present_flag | u(1) |
| if ( ash_attr_region_qp_delta_present_flag ) { | |
| ash_attr_qp_region_box_origin_x | ue(v) |
| ash_attr_qp_region_box_origin_y | ue(v) |
| ash_attr_qp_region_box_origin_z | ue(v) |
| ash_attr_qp_region_box_width | ue(v) |
| ash_attr_qp_region_box_height | ue(v) |
| ash_attr_qp_region_box_depth | ue(v) |
| ash_attr_region_qp_delta | se(v) |
| } | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE AND POINT CLOUD DATA RECEPTION METHOD

CROSS-REFERENCE TO RELATED APPLICATIONS

This application is a National Stage application under 35 U.S.C. § 371 of International Application No. PCT/KR2022/003081, filed on Mar. 4, 2022, which claims the benefit of Korean Application No. 10-2021-0028694, filed on Mar. 4, 2021. The disclosures of the prior applications are incorporated by reference in their entirety.

TECHNICAL FIELD

Embodiments relate to methods and devices for processing point cloud content.

BACKGROUND

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity Another object of the present disclosure is to provide a point cloud data transmission device, a point cloud data transmission method, a point cloud data reception device, and a point cloud data reception method for improving the compression performance of the point cloud by improving the technique of encoding attribute information of geometry-based point cloud compression (G-PCC).

Another object of the present disclosure is to provide a point cloud data transmission device, a point cloud data transmission method, a point cloud data reception device, and a point cloud data reception method for improving the efficiency of geometry and attribute compression by preserving critical points during lossy compression.

A further object of the present disclosure is to provide a point cloud data transmission device, a point cloud data transmission method, a point cloud data reception device, and a point cloud data reception method for improving the efficiency of attribute compression by enabling single recoloring after geometry compression.

Objects of the present disclosure are not limited to the aforementioned objects, and other objects of the present disclosure which are not mentioned above will become apparent to those having ordinary skill in the art upon examination of the following description.

Technical Solution

To achieve these objects and other advantages, a method of transmitting point cloud data is provided in an aspect of the present disclosure. The method may include: encoding geometry information including positions of points of the point cloud data; encoding attribute information on the points of the point cloud data based on the geometry information; and transmitting the encoded geometry information, the encoded attribute information, and signaling information.

According to an embodiment, encoding the geometry information may include: sampling the points of the point cloud data based on a sampling scale; generating an octree based on the sampled points; and compressing occupancy codes of the octree to output the octree as a geometry bitstream.

According to an embodiment, the signaling information may include information related to the sampling.

According to an embodiment, the information on the sampling may be information for identifying positional differences between original points and the sampled points.

According to an embodiment, the information related to the sampling may be included in the geometry bitstream.

According to an embodiment, the information related to the sampling may be included in at least one of a sequence parameter set, a geometry parameter set, an attribute parameter set, a tile parameter set, or a geometry slice header.

According to an embodiment, encoding the attribute information may include performing encoding based on attribute values of the sampled points.

In another aspect of the present disclosure, there is provided a device configured to transmit point cloud data. The device may include: a geometry encoder configured to encode geometry information including positions of points of the point cloud data; an attribute encoder configured to encode attribute information on the points of the point cloud data based on the geometry information; and a transmitter configured to transmit the encoded geometry information, the encoded attribute information, and signaling information.

According to an embodiment, the geometry encoder may be configured to: sample the points of the point cloud data based on a sampling scale; generate an octree based on the sampled points; and compress occupancy codes of the octree to output the octree as a geometry bitstream.

According to an embodiment, the signaling information may include information related to the sampling.

According to an embodiment, the information related to the sampling may be information for identifying positional differences between original points and the sampled points.

According to an embodiment, the information related to the sampling may be included in the geometry bitstream.

According to an embodiment, the information related to the sampling may be included in at least one of a sequence parameter set, a geometry parameter set, an attribute parameter set, a tile parameter set, or a geometry slice header.

According to an embodiment, the attribute encoder may be configured to perform encoding based on attribute values of the sampled points.

In another aspect of the present disclosure, there is provided a method of receiving point cloud data. The method may include: receiving geometry information, attribute information, and signaling information; decoding the geometry information based on the signaling information; decoding the attribute information based on the signaling information and the geometry information; and rendering reconstructed point cloud data based on the decoded geometry information and the decoded attribute information.

According to an embodiment, the decoded geometry information may include positions of points of the reconstructed point cloud data, and the decoded attribute information may include attribute values of the points of the reconstructed point cloud data.

According to an embodiment, the signaling information may include information related to sampling, and decoding the geometry information may include reconstructing the geometry information based on the information related to the sampling.

According to an embodiment, the information related to the sampling may be information for identifying positional differences between original points and sampled points.

According to an embodiment, the information related to the sampling may be included and received in a geometry bitstream including the geometry information.

According to an embodiment, the information related to the sampling may be included and received in at least one of a sequence parameter set, a geometry parameter set, an attribute parameter set, a tile parameter set, or a geometry slice header.

According to an embodiment, decoding the attribute information may include performing decoding based on the geometry information reconstructed based on the information related to the sampling.

Advantageous Effects

According to embodiments, a point cloud data transmission method, a point cloud data transmission device, a point cloud data reception method, and a point cloud data reception device may provide high-quality point cloud services.

According to embodiments, a point cloud data transmission method, a point cloud data transmission device, a point cloud data reception method, and a point cloud data reception device may achieve various video codec approaches.

According to embodiments, a point cloud data transmission method, a point cloud data transmission device, a point cloud data reception method, and a point cloud data reception device may provide versatile point cloud content such as autonomous driving services.

According to embodiments, a point cloud data transmission method, a point cloud data transmission device, a point cloud data reception method, and a point cloud data reception device may perform spatially adaptive segmentation on point cloud data for independent encoding and decoding of the point cloud data, thereby providing enhanced parallel processing and scalability.

According to embodiments, a point cloud data transmission method, a point cloud data transmission device, a point cloud data reception method, and a point cloud data reception device may spatially partition point cloud data into tiles and/or slices for encoding and decoding thereof and transmit data required for the spatial partitioning, thereby improving the performance of point cloud encoding and decoding.

According to embodiments, a point cloud data transmission method, a point cloud data transmission device, a point cloud data reception method, and a point cloud data reception device may set the attribute values of points of reconstructed point cloud data to the attribute values of original points, thereby improving the quality of attribute encoding/decoding of point cloud data and the efficiency of geometry compression.

According to embodiments, a point cloud data transmission method, a point cloud data transmission device, a point cloud data reception method, and a point cloud data reception device may perform single recoloring even when quantization is performed to generate an octree, thereby improving the quality of attribute encoding/decoding of point cloud data and the efficiency of geometry compression.

According to embodiments, a point cloud data transmission method, a point cloud data transmission device, a point cloud data reception method, and a point cloud data reception device may generate an octree through sampling and transmit the positional differences between original and sampled points in the form of metadata to perform single recoloring, thereby improving the quality of attribute encoding/decoding of point cloud data and the efficiency of geometry compression.

According to embodiments, a point cloud data transmission method, a point cloud data transmission device, a point cloud data reception method, and a point cloud data reception device may reduce the time required for attribute encoding by performing single recoloring for attribute compression.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 15(*a*) to FIG. 15(*d*) are diagrams illustrating exemplary quantization methods based on quantization scales.

FIG. 24 is a diagram illustrating an exemplary syntax structure of a sequence parameter set according to embodiments.

FIG. 25 is a diagram illustrating another exemplary syntax structure of a sequence parameter set according to embodiments.

FIG. 26 is a diagram illustrating an exemplary syntax structure of metadata_data_unit( ) according to embodiments.

FIG. 27 is a diagram an exemplary syntax structure of a geometry parameter set according to embodiments.

FIG. 28 is a diagram illustrating another exemplary syntax structure of a geometry parameter set according to embodiments.

FIG. 29 is a diagram an exemplary syntax structure of a tile parameter set according to embodiments.

FIG. 30 is a diagram illustrating another exemplary syntax structure of a tile parameter set according to embodiments.

FIG. 31 is a diagram an exemplary syntax structure of an attribute parameter set according to embodiments.

FIG. 32 is a diagram another exemplary syntax structure of an attribute parameter set according to embodiments.

FIG. 33 is a diagram illustrating an exemplary syntax structure of a geometry slice bitstream( ) according to embodiments.

FIG. 34 is a diagram illustrating an exemplary syntax structure of a geometry slice header according to embodiments.

FIG. 35 is a diagram illustrating another exemplary syntax structure of a geometry slice header according to the present disclosure.

FIG. 36 is a diagram illustrating an embodiment of a syntax structure of an attribute slice bitstream( ) according to the present disclosure.

FIG. 37 is a diagram illustrating an embodiment of a syntax structure of an attribute slice header according to the present disclosure.

BEST MODE FOR THE DISCLOSURE

Figure 1:
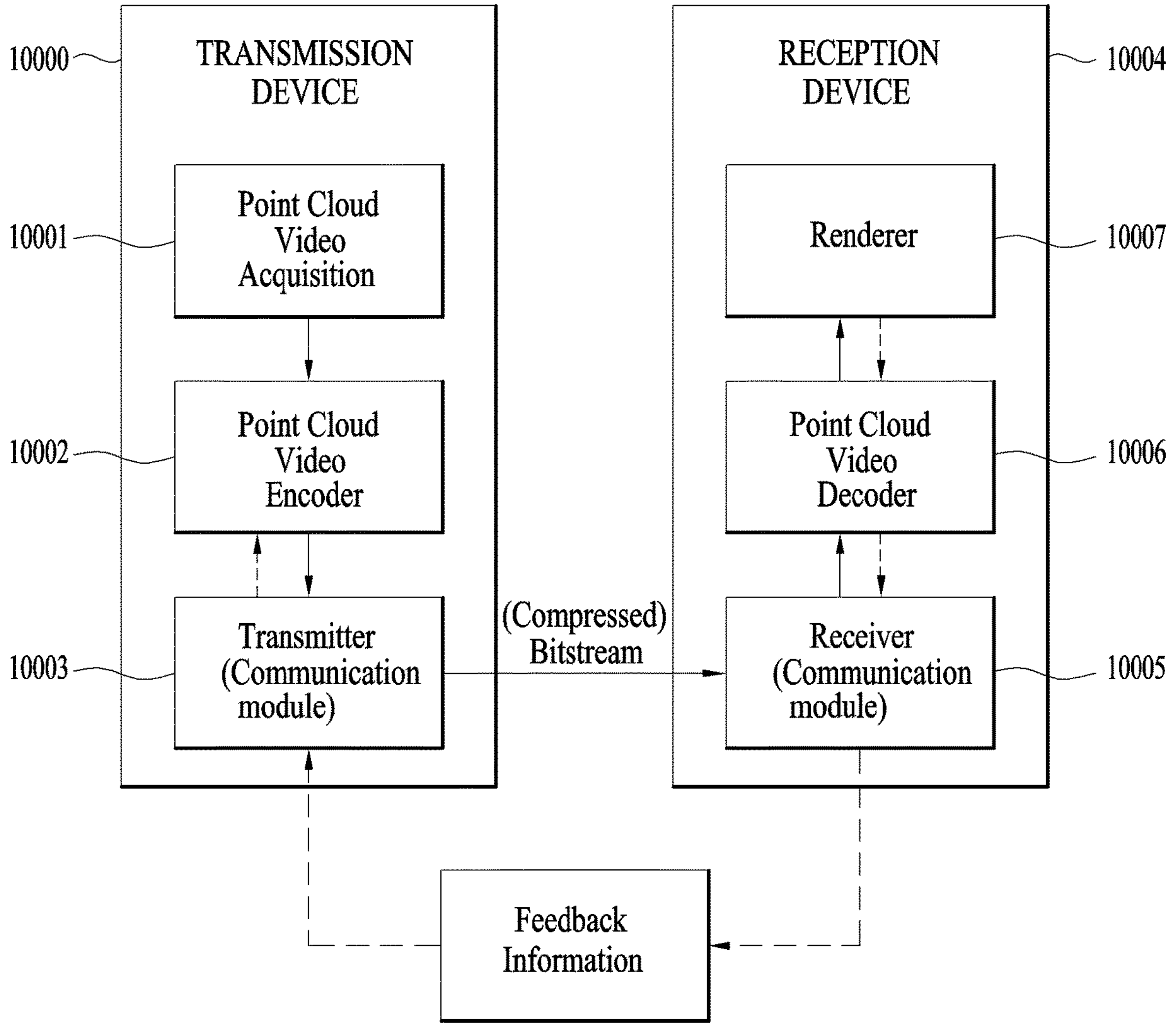
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like).

The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
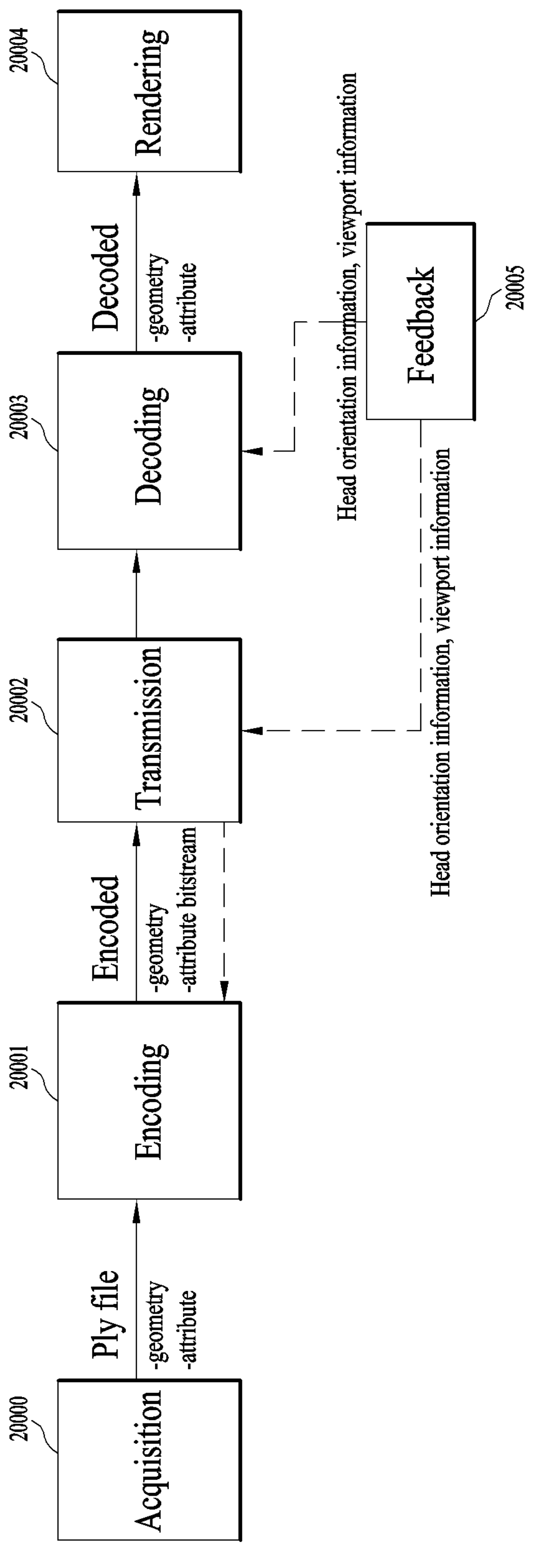
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like.

The point cloud content providing system (for example, the point cloud transmission device 10000 or the point cloud video acquisition unit 10001) may secure point cloud data from information (e.g., depth information, color information, etc.) related to the acquisition process of the point cloud video. The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
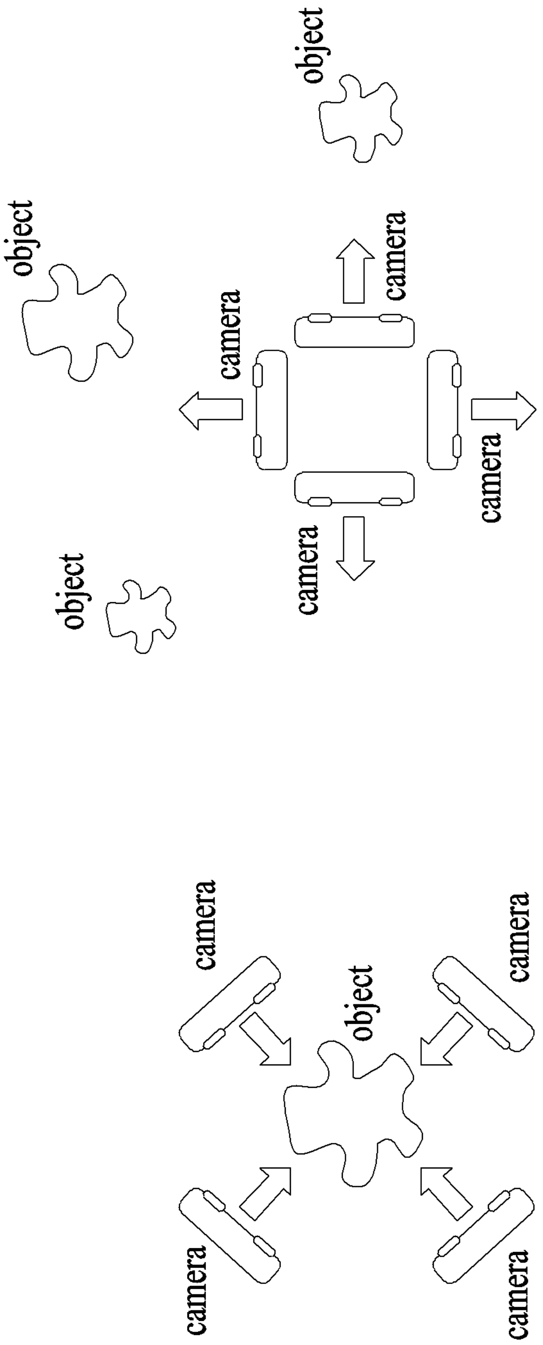
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
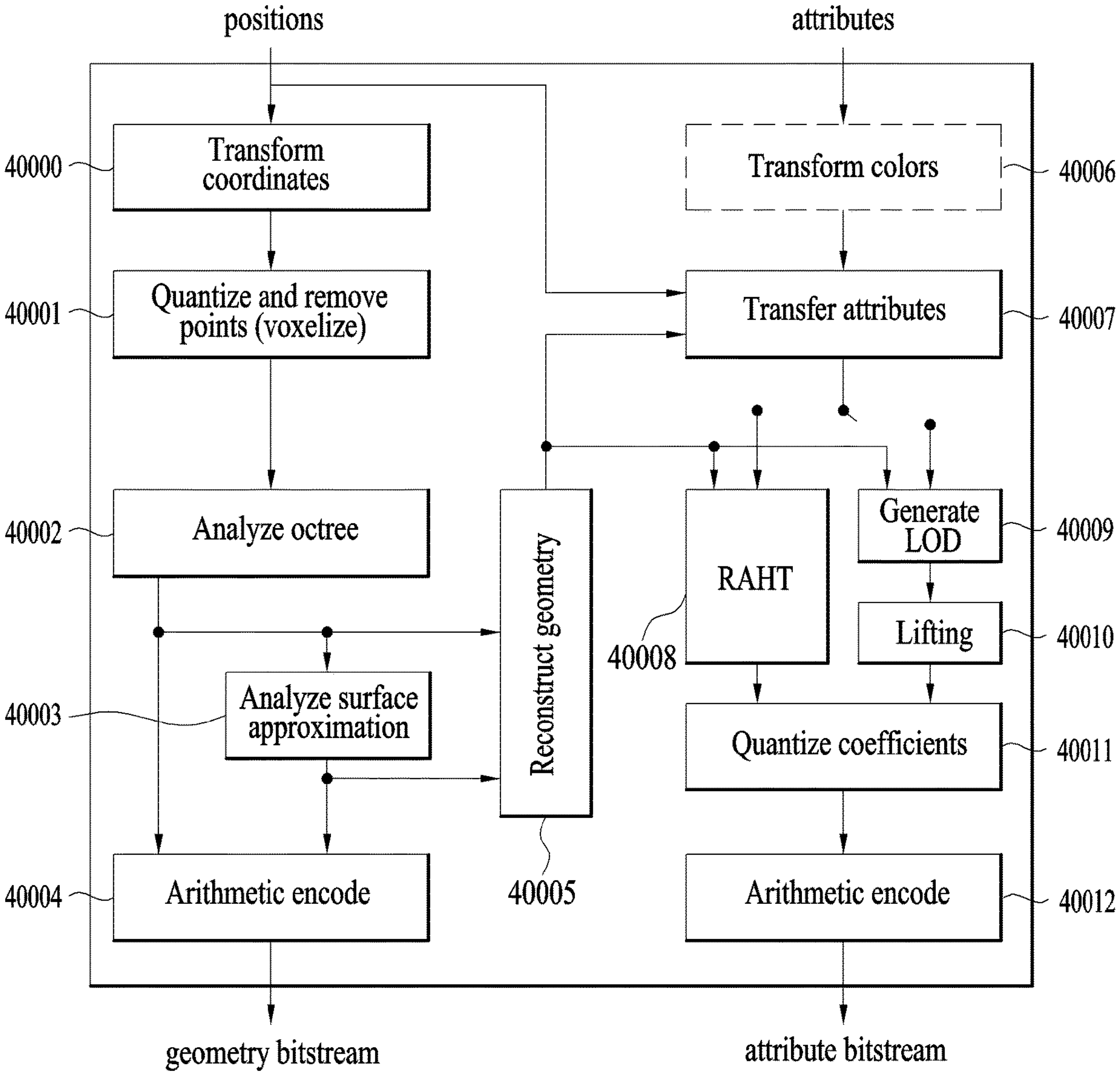
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D spacePoints of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
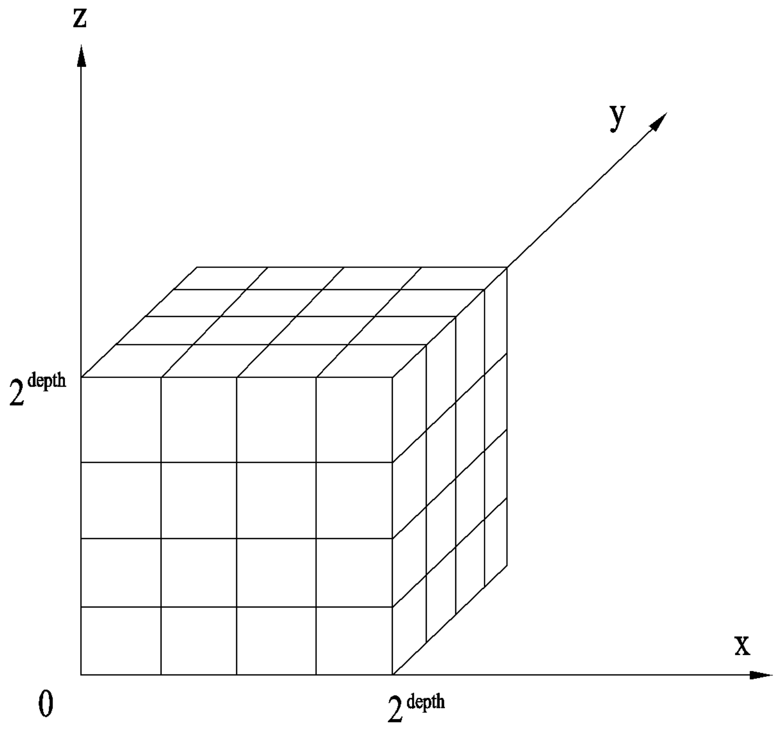
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
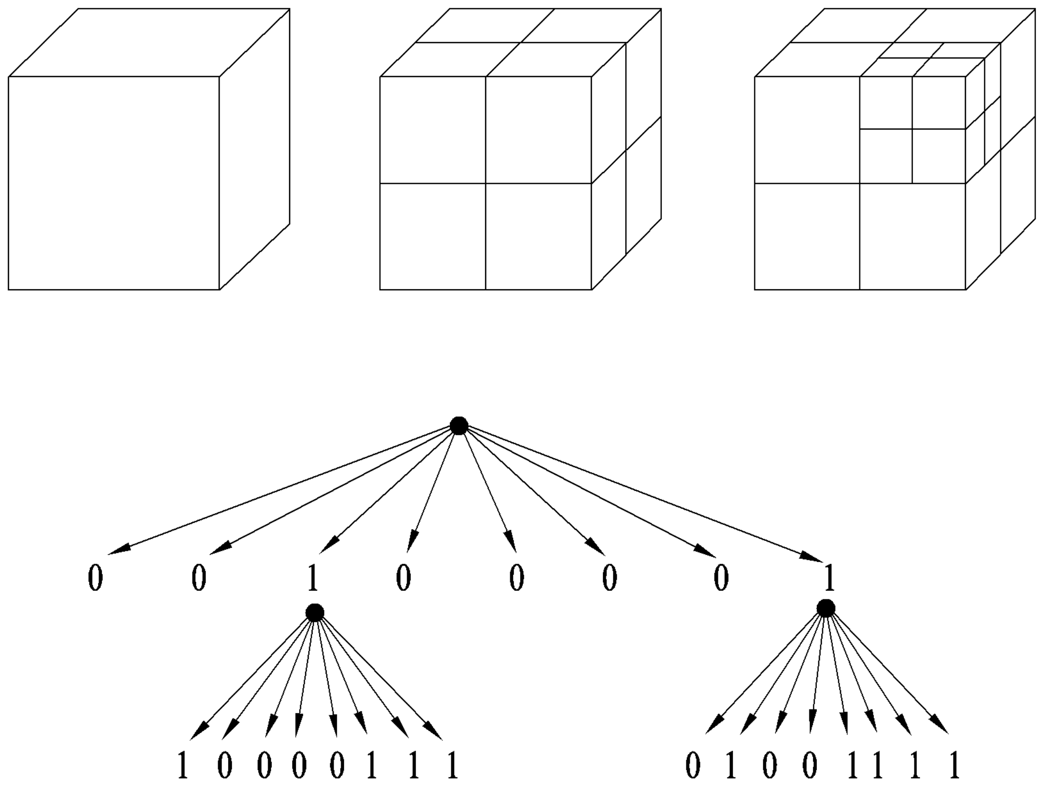
FIG. 6 illustrates an example of octree and occupancy code according to embodiments.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d=\mathrm{Ceil}\left(\mathrm{Log2}\left(\mathrm{Max}\left(x_n^{int},\,y_n^{int},\,z_n^{int},\,n=1,\,\ldots\,,\,N\right)+1\right)\right) \quad \text{[Equation 1]}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

[Equation 2]

$$\begin{bmatrix}\mu_x\\ \mu_y\\ \mu_z\end{bmatrix}=\frac{1}{2}\sum_{i=1}^{n}\begin{bmatrix}x_i\\ y_i\\ z_i\end{bmatrix} \quad ①$$

$$\begin{bmatrix}\bar{x}_i\\ \bar{y}_i\\ \bar{z}_i\end{bmatrix}=\begin{bmatrix}x_i\\ y_i\\ z_i\end{bmatrix}-\begin{bmatrix}\mu_x\\ \mu_y\\ \mu_z\end{bmatrix} \quad ②$$

$$\begin{bmatrix}\sigma_x^2\\ \sigma_y^2\\ \sigma_z^2\end{bmatrix}=\sum_{i=1}^{n}\begin{bmatrix}\bar{x}_i^2\\ \bar{y}_i^2\\ \bar{z}_i^2\end{bmatrix} \quad ③$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1, . . . , n

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |

TABLE 1-continued

| Triangles formed from vertices ordered 1, . . . , n | |
|---|---|
| n | Triangles |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

Figure 7:
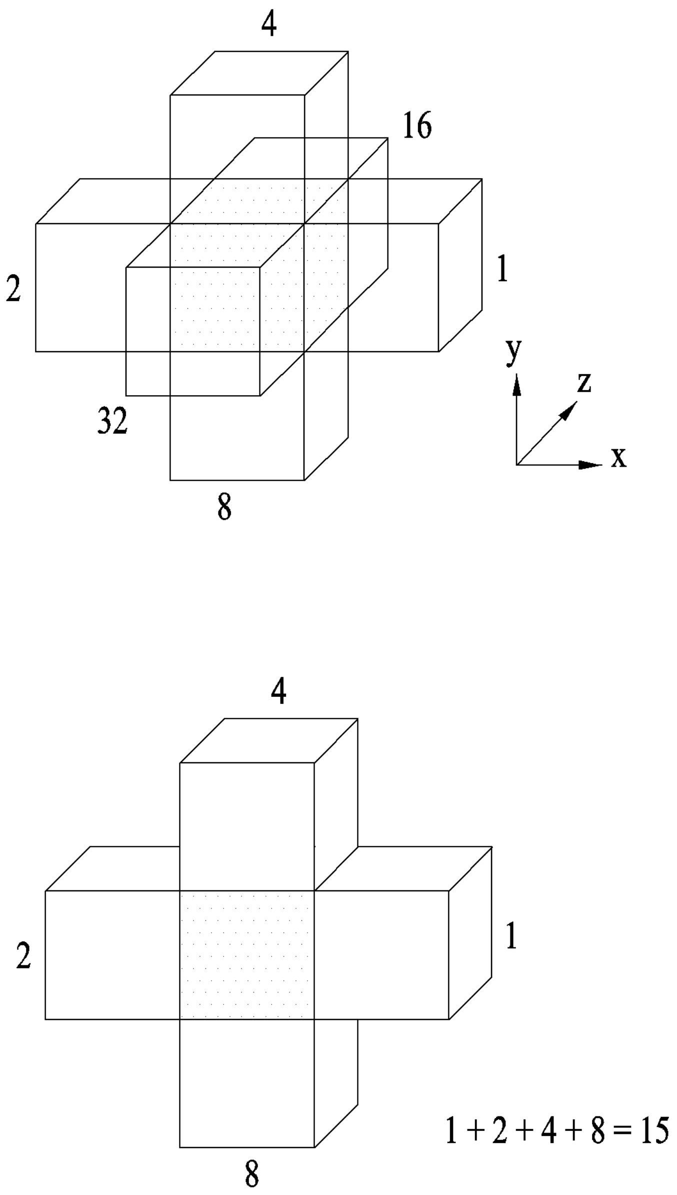
FIG. 7 illustrates an example of a neighbor node pattern according to embodiments.

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2 3=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
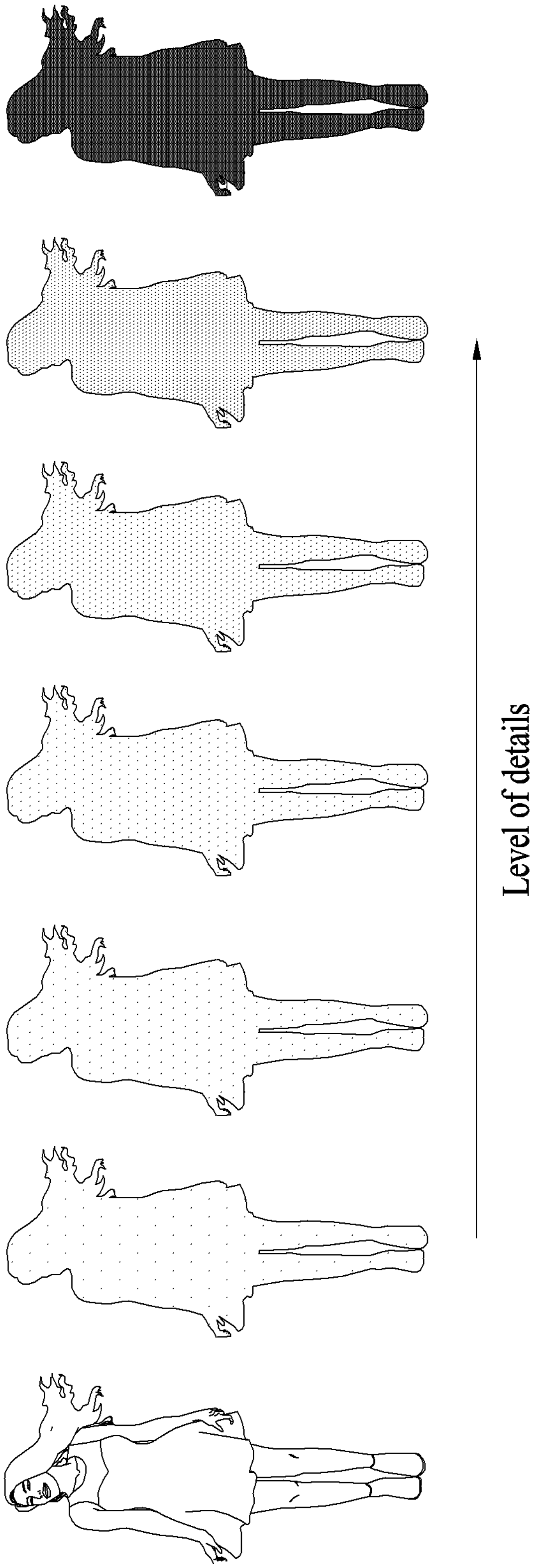
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
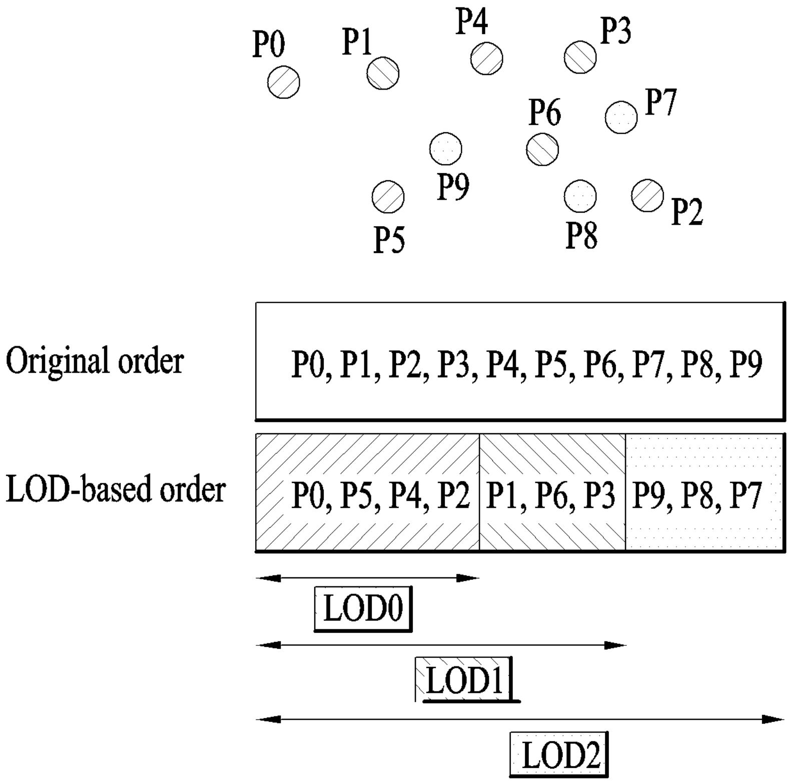
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in table 3.

TABLE 2

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

[Equation 3]

$$\begin{bmatrix} g_{l-1_{x,y,z}} \\ h_{l-1_{x,y,z}} \end{bmatrix} = T_{w1\ w2} \begin{bmatrix} g_{l_{2x,y,z}} \\ g_{l_{2x+1,y,z}} \end{bmatrix} \quad T_{w1\ w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

[Equation 4]

$$\begin{bmatrix} gDC \\ h_{0_{0,0,0}} \end{bmatrix} = T_{w1000\ w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
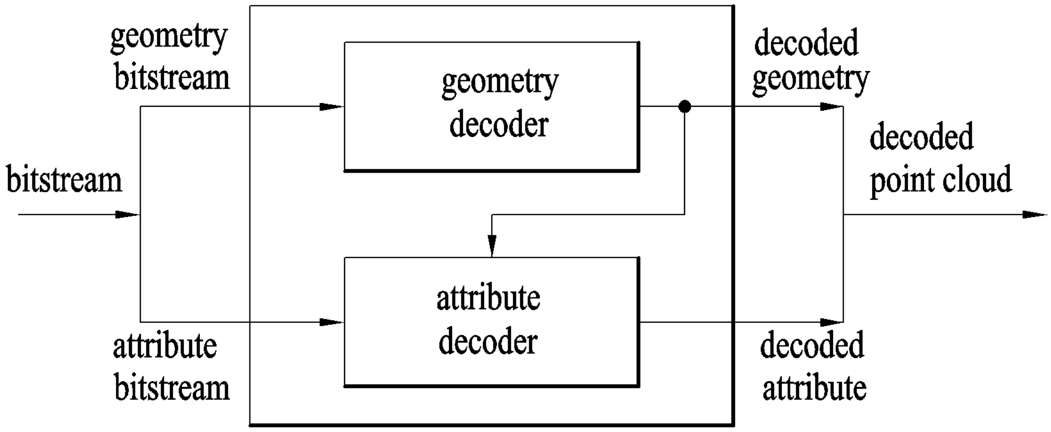
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
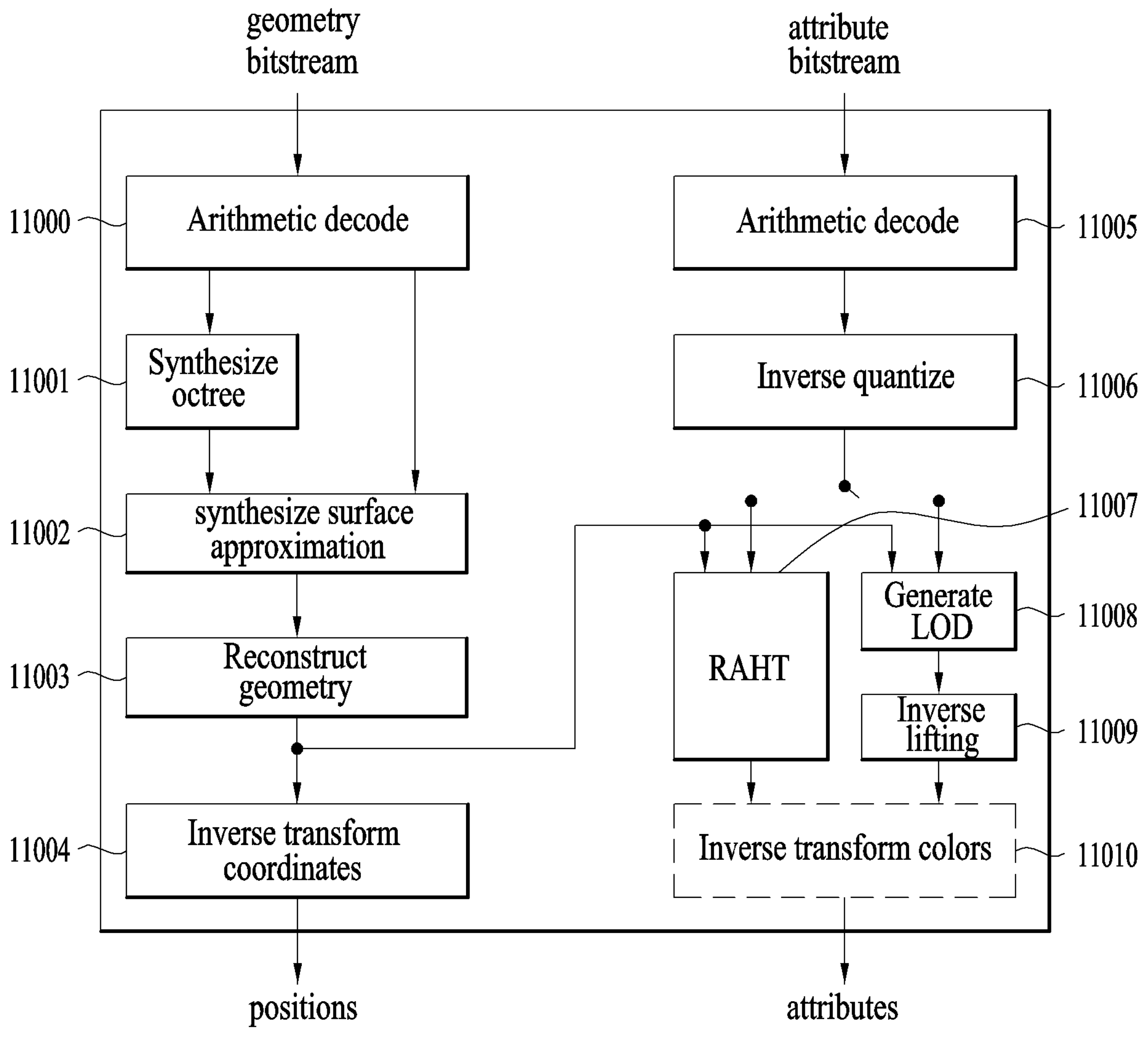
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
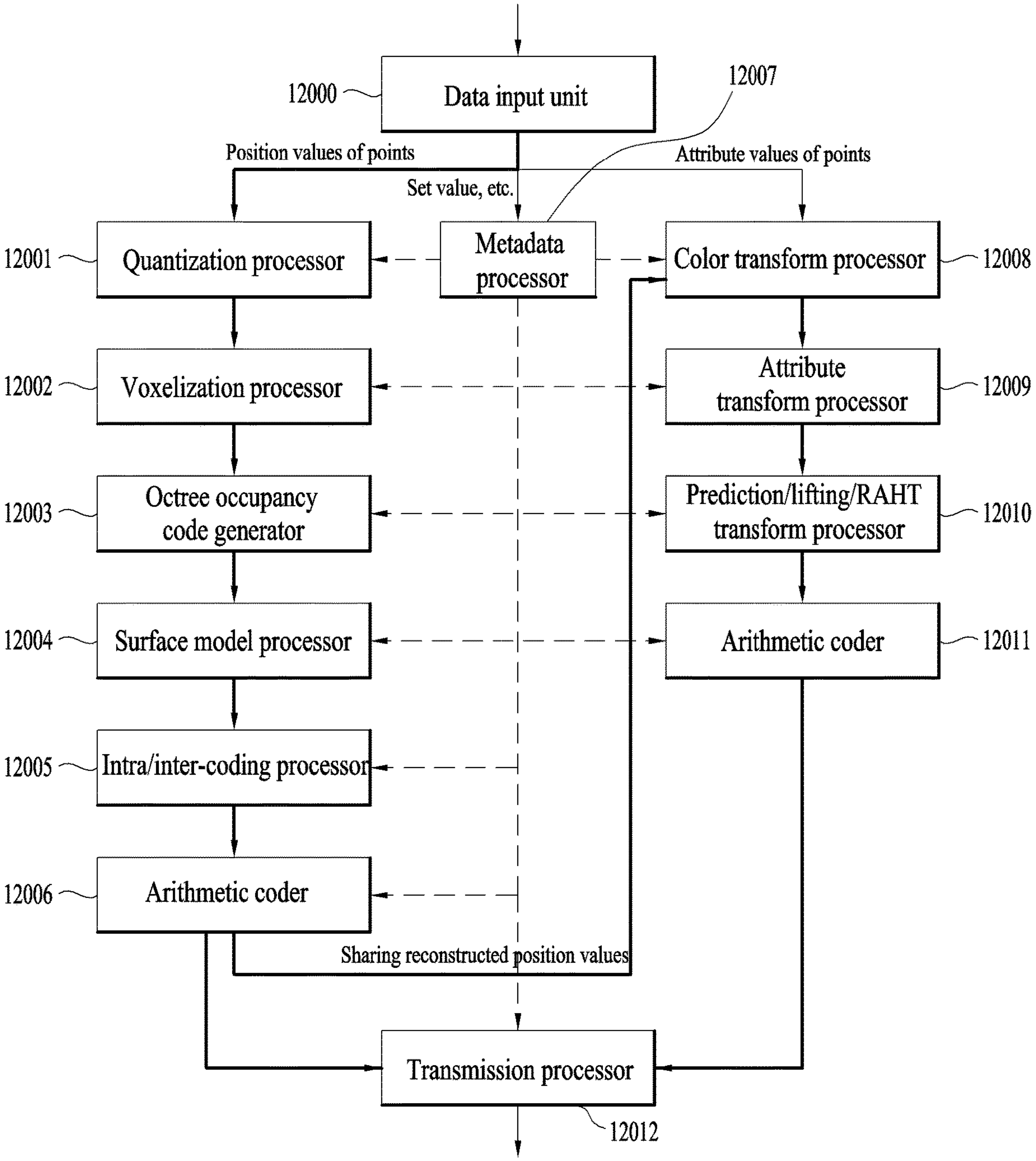
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams $Attr0^0$ and $Attr1^0$.

The slice is a series of a syntax element representing in whole or in part of the coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
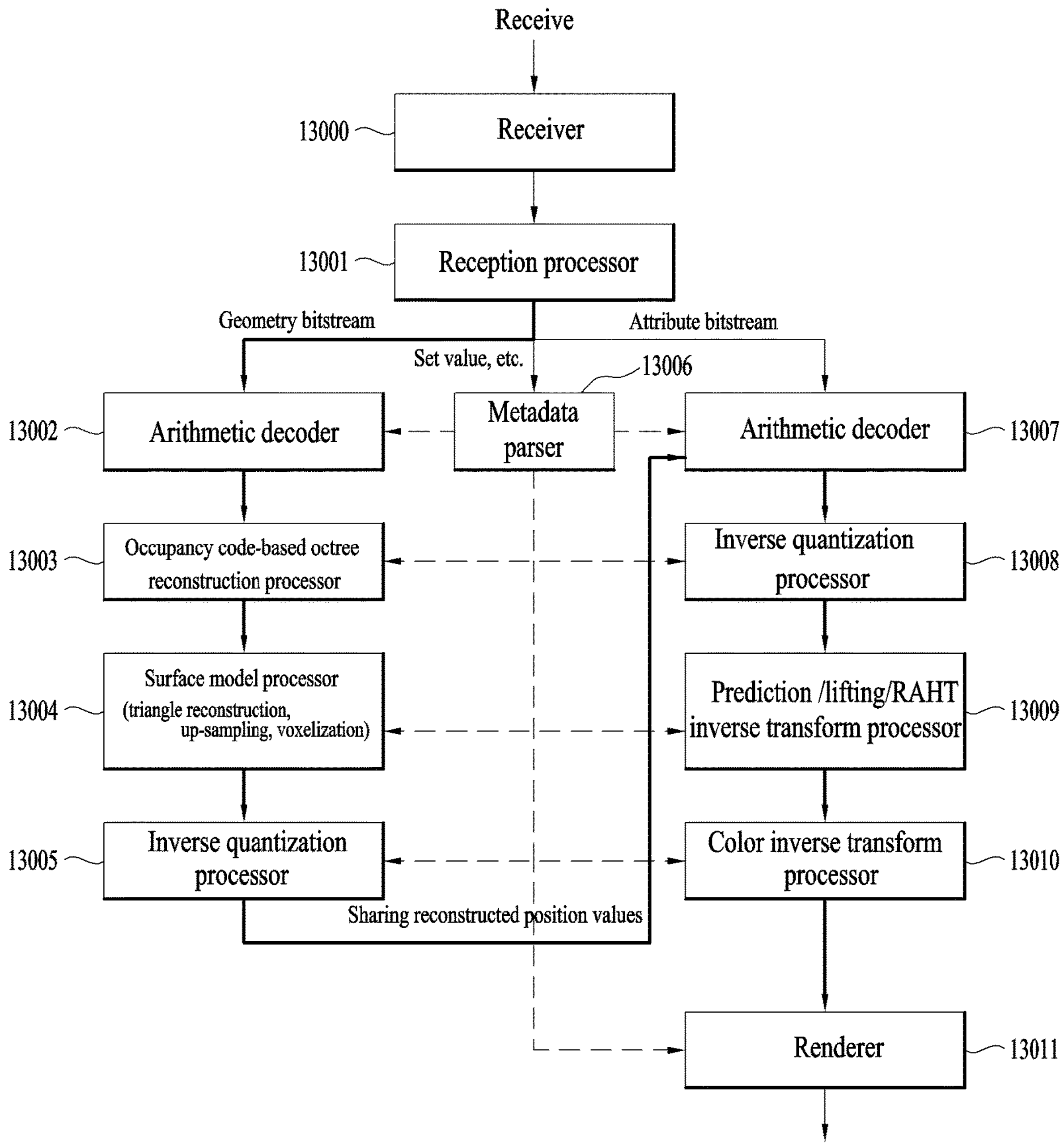
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
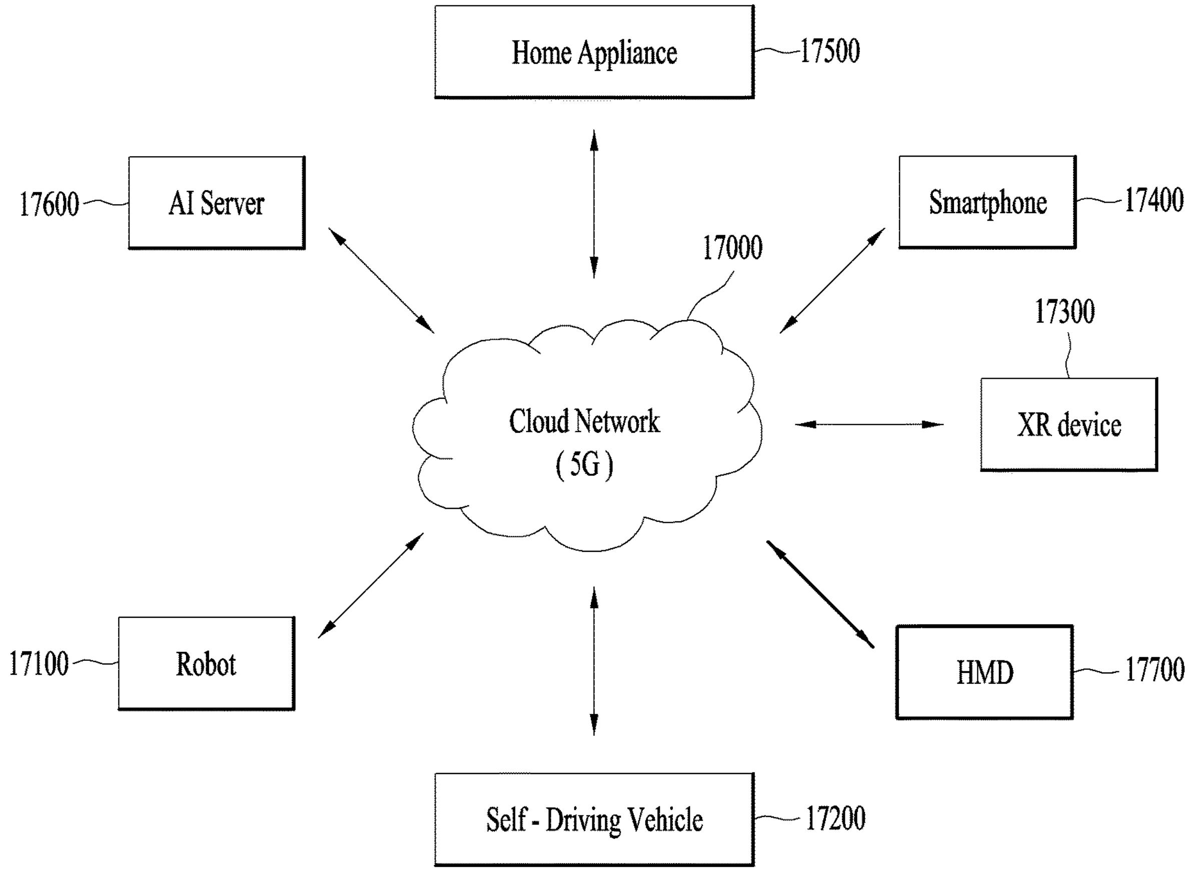
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17100. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described above, a point cloud (or point cloud data) is composed of a set of points, and each point may have geometry information and attribute information. In addition, a point cloud encoding process may include compressing a geometry and then compressing attribute information based on the geometry reconstructed based on position information changed by the compression (such a geometry is referred to as a reconstructed or restored geometry). In addition, a point cloud decoding process involves receiving an encoded geometry bitstream and an attribute bitstream, decoding a geometry, and then decoding attribute information based on the geometry reconstructed by the decoding.

Point cloud data compression may be classified into two types: lossy compression and lossless compression. For the lossy compression, geometry (i.e., position) information and attribute information may be compressed or omitted, resulting in differences from original data. On the other hand, for the lossless compression, the precision of original data is maintained as much as possible, and the number of points is also preserved to be the same as the original data. In this case, if a value is input as a floating-point number, near-lossless compression where a certain range of threshold is configured and only errors within the threshold is allowed may also be considered as the lossless compression.

According to embodiments, before compressing point cloud data, it is defined by a quantization process whether to perform lossless compression or lossy compression on all points of the input point cloud data. In this case, either the lossless compression or the lossy compression is determined based on the bitrate allocated per point, which is calculated as bits per input point (bpip) and bits per output point (bpop). Currently, the compression is performed based on the bits per rate defined in the geometry point cloud compression (G-PCC) standard. The bits per rate ranges from r01 (0.5 to 1.4 bpip) to r06 (18 to 21 bpip).

According to embodiments, lossy compression is executed based on a quantization process, and the amount of lossy compression is determined by scaling of a geometry value, which is used to determine the size of a lossy compression bitstream. That is, the amount of lossy compression is calculated by a quantization parameter (QP) and a quantization step size (qS). In other words, the quantization process is performed by scaling the geometry value with the QP. In this case, the QP is calculated as a positive real number of qS, and each of the following geometry values: x, y, and z of an input point cloud is multiplied by the qS. According to embodiments, the qS may be derived from the QP. Equation 5 below is an exemplary calculation for deriving the qS based on the QP.

$$QStep = geomLevelScale[QP \% 6] \ll (QP/6) \quad \text{[Equation 5]}$$

$$qS = 1/4(4 + (QP \bmod 4) \times 2\,\hat{}\,(\lfloor QP/4 \rfloor)$$

The current G-PCC uses, as the qS, the following real numbers: 1, 1.25, 1.5, 1.75, 2, 2.5, 3, 3.5, 4, 5, 6, 7, 8, 10, 12, 14, 16, 20, 24, 28, 32, 40, 48, 56, 64, 80, 96, 112, 128, 160, 192, 224, 256, 320, 384, 448, 512, 640, 768, 896, 1024, and so on. The larger the qS is, the more quantization is, and thus a high rate of lossy compression is achieved. That is, in this document, the qS refers to the step size used for the following rates: r01 to r06. In the case of the lossy compression, the bitrate may be determined, and the bitrate may be adjusted by the following equation: sampling rate=bitrate/quantization per sample.

According to embodiments, the quantization process is performed immediately after point cloud data is input. When the quantization process is performed, one or more points may have the same quantized position (or position value) based on the quantization step size.

FIG. 15(*a*) to FIG. 15(*d*) are diagrams illustrating exemplary quantization methods based on quantization scales.

Specifically, FIG. 15(*a*) illustrates original (source) points input for quantization. FIG. 15(*b*) illustrates an exemplary quantization method with a quantization scale of 0.5, FIG. 15(*c*) illustrates an exemplary quantization method with a quantization scale of 0.25, and FIG. 15(*d*) illustrates an exemplary quantization method with a quantization scale of 0.125. In this document, the term "quantization scale" refers to a value used for scaling. In one embodiment, specific scaling values are designated for each step.

Assuming that five original points are positioned in a 5×5 space as shown in FIG. 15(*a*), if the quantization scale is 0.5 as shown in FIG. 15(*b*), the precision of all points is reduced by half (i.e., ½). For example, in FIG. 15(*b*), points within a range of (0, 0) to (1, 1) correspond (or map) to a point of (0, 0). If the quantization scale is 0.25 as shown in FIG. 15(*c*), the precision of all points is reduced by a factor of 0.25 (i.e., ¼). For example, in FIG. 15(*c*), points within a range of (0, 0) to (2, 2) correspond (or map) to the point of (0, 0). If the quantization scale is 0.125 as shown in FIG. 15(*d*), the precision of all points is reduced by a factor of 0.125 (i.e., ⅛). For example, in FIG. 15(*d*), points within a range of (0, 0) to (4, 4) correspond (or map) to the point of (0, 0). In other words, as the quantization scale decreases, the number of lost points increases because more points in space correspond to (or map) to one point.

When quantization is applied as described above, one or more points may have the same quantized position (or position value).

Figure 16:
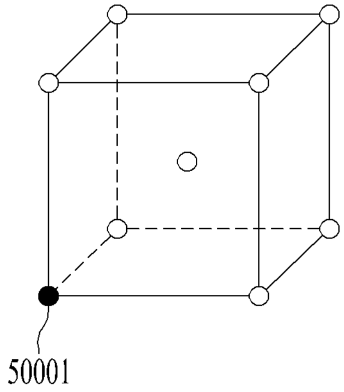
FIG. 16 is a diagram illustrating exemplary positions of points after quantization according to embodiments.

In this case, after the quantization, points may be mapped to a position of (0, 0, 0) 50001 as shown in FIG. 16. Alternatively, the points may be mapped to a position within a space from (0, 0, 1) to (1, 1, 1) or a central position of (0.5, 0.5, 0.5), depending on the precision or characteristics of point cloud.

FIG. 16 is a diagram illustrating exemplary positions of points after quantization according to embodiments.

According to embodiments, an octree structure is generated based on quantized points after the quantization is performed.

According to embodiments, levels are defined in order to transmit an octree with a specific precision level. The space is divided into 8 equal parts up to a depth (L) that represents the geometry precision of the octree maximum level.

To perform lossy compression at the maximum depth of L, the geometry precision is adjusted to level L-M (where M represents the quantization step). The points from level L-M to level L are quantized, and modified leaf nodes are positioned at level L-M. In other words, the points from level L-M to level L, that is, from the lower level to the maximum level, are quantized by dividing level L-M by precision, and the modified leaf nodes are positioned at level L-M. Moreover, the adjusted geometry precision has a geometry value modified to the central value of an octree node or a value defined for the octree node. Then, geometry compression is executed. In this case, octree-based geometry compression is carried out based on lossless compression.

However, as described above, when geometry compression is performed by generating an octree structure based on quantized points, recoloring is essential before performing attribute encoding (also called compression).

According to embodiments, recoloring refers to a process of calculating the average of the attributes of neighboring points within a specific position/radius from the position of a quantized point and setting the average to the attributes of the quantized point. According to embodiments, recoloring is referred to as attribute transform or color readjustment. In addition, recoloring is performed by the attribute transformer 40007 shown in FIG. 4 or the attribute transform processor 12009 shown in FIG. 12. For example, assuming that points at level L are mapped to a specific point at level L-M according to the above-described quantization, since the attributes of the points at level L are unknown due to the quantization, the attributes of the points at level L-M need to be configured by recoloring.

Hereinafter, a recoloring method will be described.

(1) For each point of the reconstructed point cloud, the attribute value of the closest neighboring point is denoted by $a_i^*$.

(2) For each point in the reconstructed point cloud, H(i) is defined as a set of original points. In other words, H(i) represents a set of neighboring points.

(3) In this case, points that share $X_i$ are designated as close neighboring points of the reconstructed points, and H(i) may be empty or have one or more values. In this case, if H(i) is empty, it means that there are no points within a specific distance when searching for the close neighboring points.

(4-1) If H(i) is empty, the attribute value $a_i^*$ is assigned as the attribute value of the point Xi. That is, one point corresponds to one attribute.

(4-2) If H(i) is not empty, the attribute value $a_i$ is calculated according to Equation 6 below.

$$\tilde{a}_i = \frac{1}{H(i)} \sum_{h=1}^{H(i)} a_i^+(h) \quad \text{[Equation 6]}$$

Therefore, when the attribute value $a_i^*$ of a point is assigned as the attribute values of points that are not related at all by the recoloring process based on Equation 6, the attribute value $a_i^*$ of the point is reconstructed into an attribute value different from that of the original point cloud due to the average calculation of attribute values. For example, while the attribute value (i.e., color value) of an original point is red, the attribute value reconstructed according to Equation 6 may be a color other than red. For example, the attribute value (i.e., color value) of the original point might be red, whereas the attribute value reconstructed according to Equation 6 could become a different color other than red.

When the attribute value is reconstructed into a different value by recoloring, performing attribute compression based on the different value may result in a decrease in attribute compression efficiency. In other words, this leads to an issue that the quality of attribute encoding/decoding of point cloud data is degraded.

To address the issue that it is difficult to obtain accurate attribute values, the present disclosure proposes to set the attribute value of a point in reconstructed point cloud data to the attribute value of the original point, thereby improving the quality of attribute encoding/decoding of the point cloud data and enhancing the efficiency of geometry compression.

The present disclosure proposes two methods. One method involves performing quantization of input points for geometry compression, creating an octree structure based on the quantized points, and then performing attribute encoding based on the attribute values of original points. In this document, the method is referred to as a first embodiment. Another method involves performing sampling of input points for geometry compression, creating an octree structure based on the sampled points, and performing attribute encoding based on the attribute values of original points. In this document, the method is referred to as a second embodiment.

In summary, the present disclosure aims to perform geometry compression based on an octree structure and use the attribute values of original points in performing attribute encoding based on the reconstructed geometry without recoloring.

In the present disclosure, the above process is referred to as a single recoloring process. In other words, the single recoloring process means that the attribute values of original points are directly employed in attribute encoding. Therefore, the single recoloring process may be referred to as a 'recoloring omission process'.

In the first embodiment, the single recoloring process is performed for a representative point in performing steps (1) to (3) among the above-described recoloring steps. In other words, if H(i) is not empty, the attribute value of one point (e.g., second point) among i points is determined to be the attribute value $a_i$ of a reconstructed point according to Equation 7 below.

$$\tilde{a}_i = \frac{a_i^+}{H(i)} \quad \text{[Equation 7]}$$

In other words, when H(i) is not empty, the average calculation equation for obtaining the attribute average is not used.

According to the first embodiment, the transmitting side operates in the following order: quantization→octree encoding→single recoloring→attribute compression, and the receiving side operates in the following order: octree decoding→attribute decoding.

In the second embodiment, instead of quantization, sampling is performed for the purpose of single recoloring, which means omitting the recoloring process.

Figure 19:
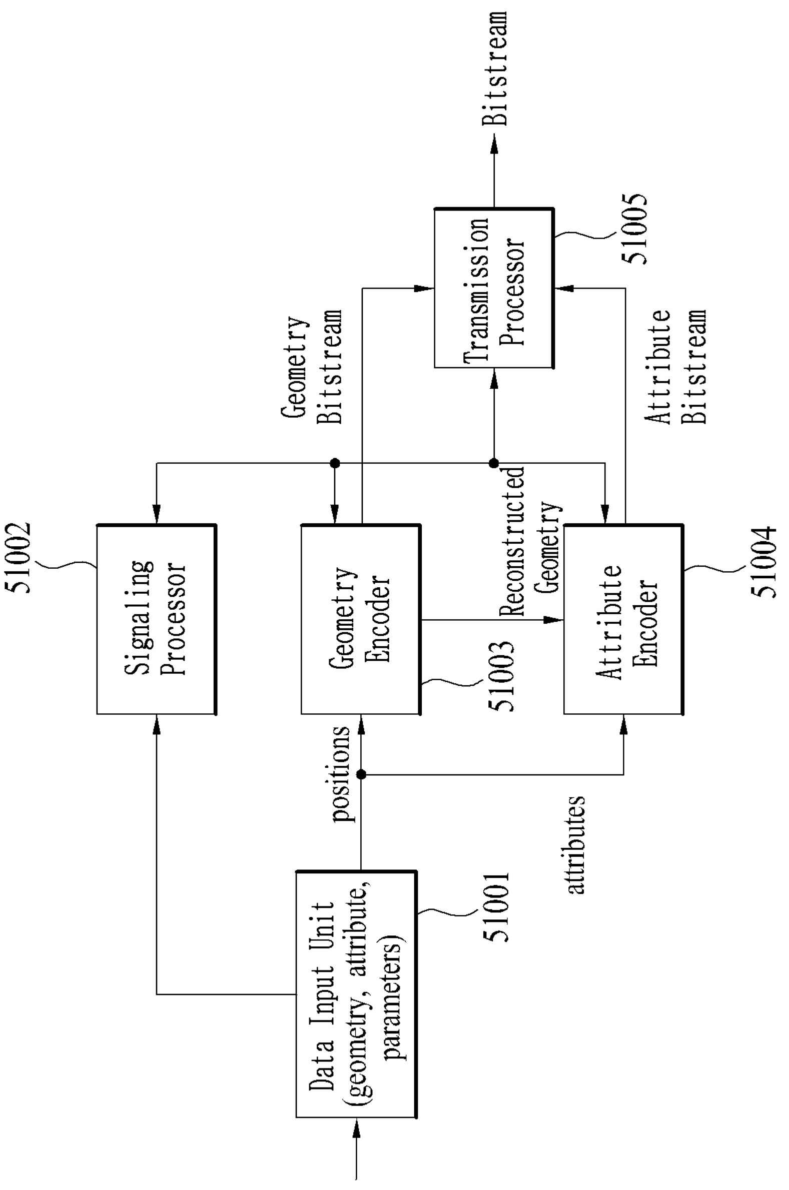
FIG. 19 is a diagram illustrating another exemplary point cloud transmission device according to embodiments.
Figure 20:
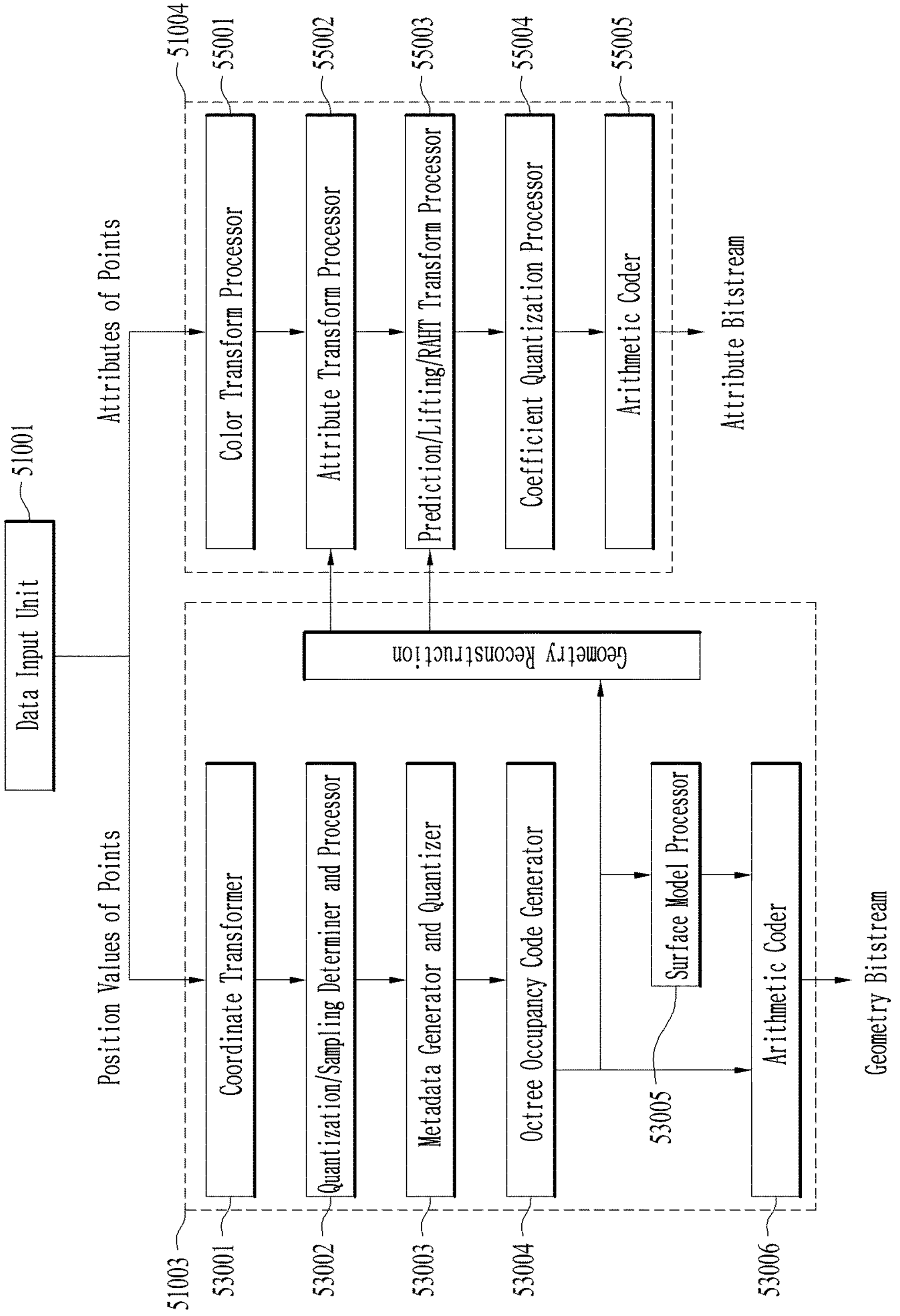
FIG. 20 is a detailed block diagram showing a geometry encoder and an attribute encoder according to embodiments.

According to embodiments, a process for encoding point cloud data according to the first and/or second embodiment may be performed by the point cloud video encoder 10002 of FIG. 1, the encoding step 20001 of FIG. 2, the point cloud video encoder of FIG. 4, the point cloud video encoder of FIG. 12, or a geometry encoder 51003 and an attribute encoder 51004 of FIGS. 19 and 20.

Figure 21:
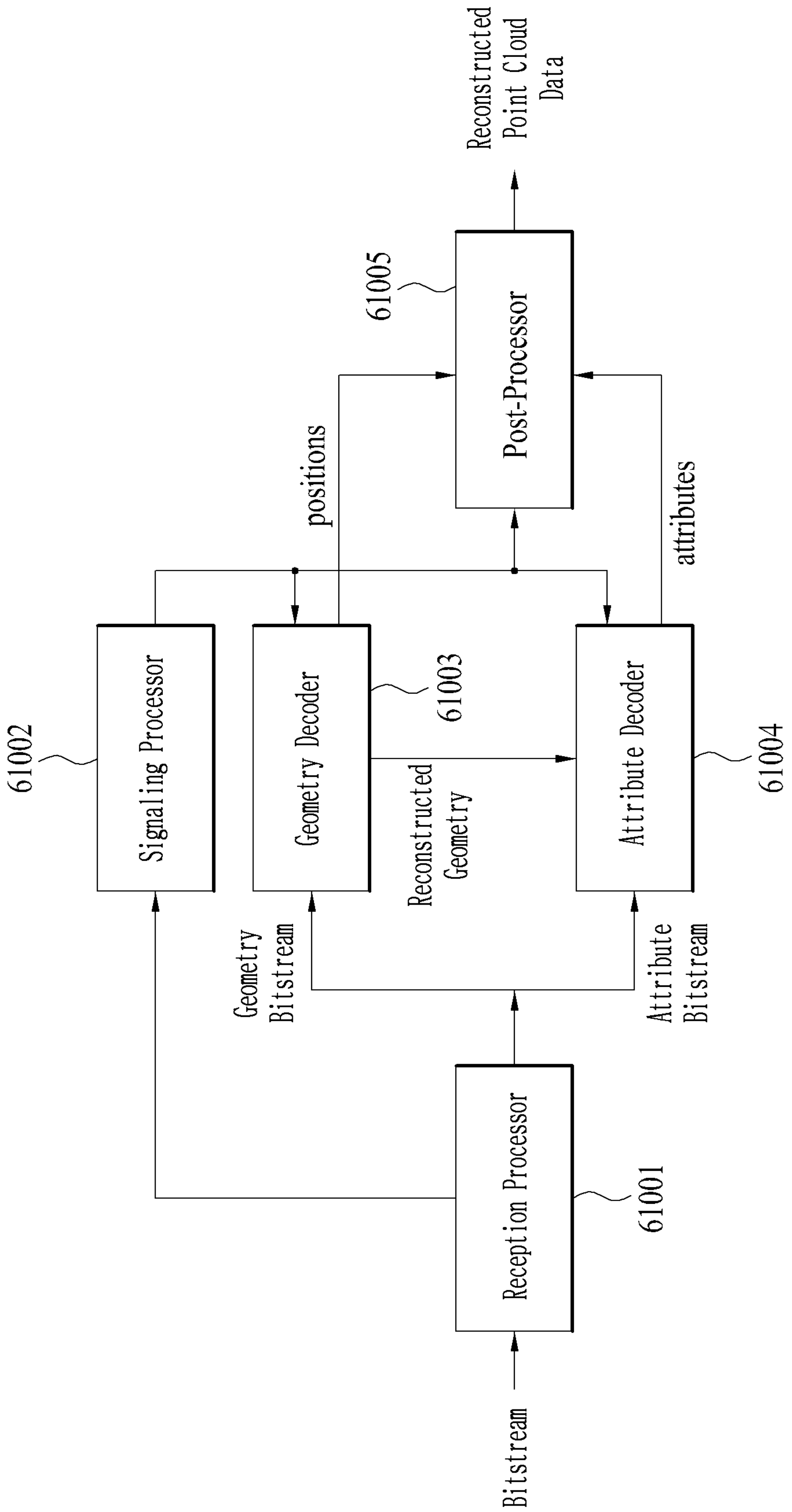
FIG. 21 is a diagram illustrating another exemplary point cloud reception device according to embodiments.
Figure 22:
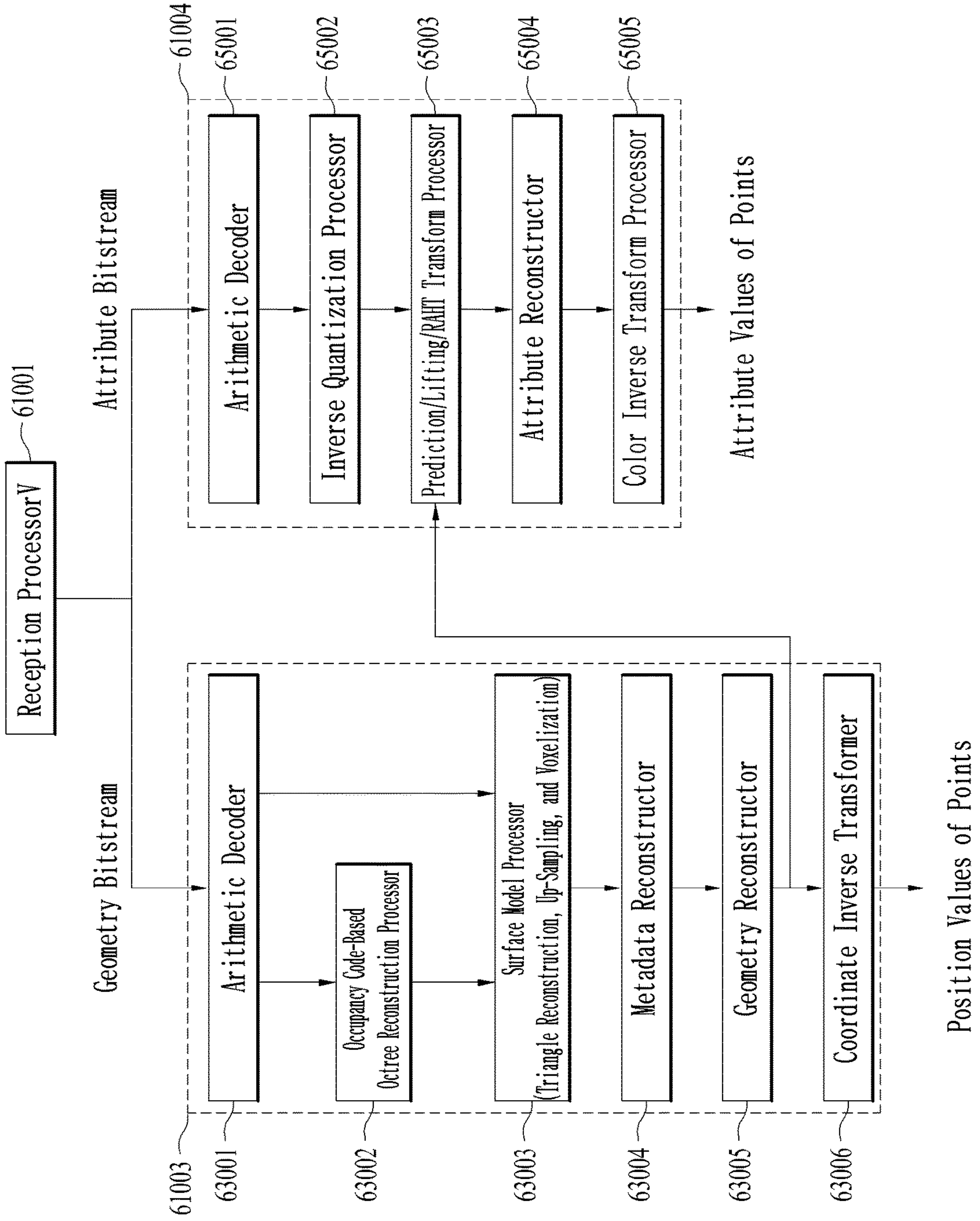
FIG. 22 is a detailed block diagram illustrating a geometry decoder and an attribute decoder according to embodiments.

According to embodiments, a process for decoding point cloud data according to the first and/or second embodiment may be performed by the point cloud video decoder 10006 of FIG. 1, the decoding step 20003 of FIG. 2, the point cloud video decoder of FIG. 11, the point cloud video decoder of FIG. 13, or a geometry decoder 61003 and an attribute decoder 61004 of FIGS. 21 and 22. The elements shown in FIGS. 19 to 22 will be described in detail later.

Quantization and sampling have a common point in that the quantization and sampling are to adjust the amount of data (=the number of points) depending on the bitrate in lossy compression of point cloud data. However, in terms of compression efficiency, the quantization and sampling may have up to a 200% difference. The quantization is a process of reconstructing values with a discrete distribution under the assumption that point positions have continuous values, while the sampling is a process of selecting data at regular intervals. Therefore, if the same number of points are output by performing quantization and sampling of a point cloud with the same input values, it is possible to obtain a quantized point cloud and a sampled point cloud having the same number of points but different geometric precision.

Hereinafter, the second embodiment will be described.

The second embodiment uses a sampling method of selecting some of the input points depending on the encoding precision, and the sampled points are used to generate an octree structure. In addition, the attribute values of the sampled points (i.e., original points) are used for attribute compression. In other words, point cloud data is sampled, and attribute encoding/decoding is performed with the geometric precision of the original point cloud data, which is not quantized. The sampled points may be compressed, and differences between the sampled point cloud and the original point cloud may be transmitted as metadata (or referred to as signaling information). In this case, the metadata may be quantized with the sampling rate or quantization per sample value to match the bitrates therebetween. Accordingly, image quality and visual quality may be improved. In the present disclosure, the metadata will be referred to as compression-related information (or information on compression) for convenience of description. Alternatively, the compression-related information may be considered to include the metadata.

For sampling according to the second embodiment, octree levels are divided into 8 parts based on the precision level of the lossy compression. For example, assuming that the precision level (i.e., leaf nodes) used for sampling is N, and the precision level (i.e., encoding precision) used for the lossy compression is M, additional data on levels N-M to N (i.e., depth) may be transmitted as the metadata. Alternatively, the additional data may be included in a geometry bitstream and transmitted after arithmetic coding. According to embodiments, the additional data corresponds to information (e.g., octree_sampling_residual) necessary to perform decoding at levels N-M to N. In other words, since octree compression involves encoding an occupancy pattern, the occupancy of a lower level (i.e., level N) may be transmitted in the form of metadata without being included in the compressed octree.

Figure 17:
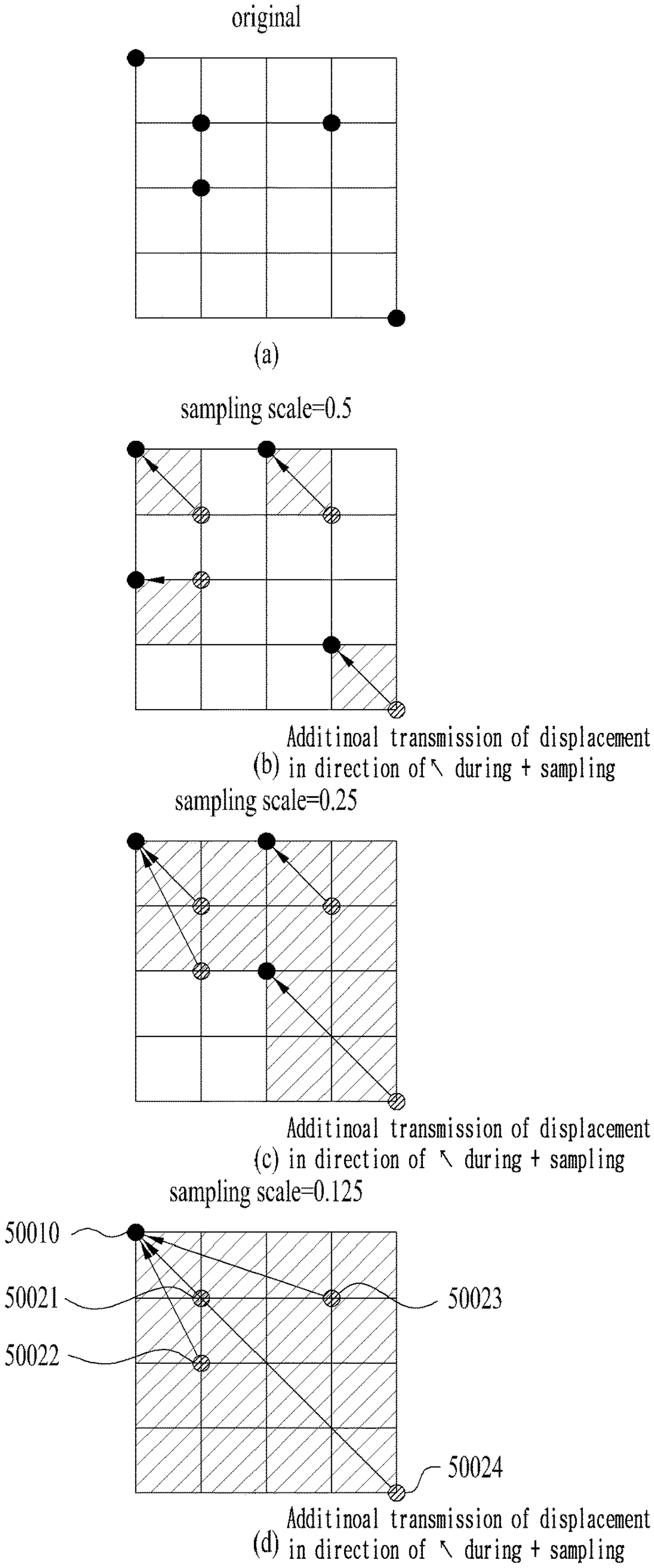
FIG. 17(*a*) to FIG. 17(*d*) are diagrams illustrating exemplary sampling methods according to a second embodiment.

FIG. 17(*a*) to FIG. 17(*d*) are diagrams illustrating exemplary sampling methods according to the second embodiment.

Specifically, FIG. 17(*a*) shows exemplary original (source) points, FIG. 17(*b*) shows a sampling method when the sampling scale is 0.5, FIG. 17(*c*) shows a sampling method when the sampling scale is 0.25, and FIG. 17(*d*) shows a sampling method when the sampling scale is 0.125.

Assuming that five original points are positioned in a 5×5 space as shown in FIG. 17(*a*), if the sampling scale is 0.5 as shown in FIG. 17(*b*), the precision of all points is reduced by half (i.e., ½). For example, in FIG. 17(*b*), the point of (1, 1) is an original point, and the point of (0, 0) is a sampled point related to the original point. In this case, the sampling arrow displacement is additionally transmitted as metadata. According to embodiments, the sampling arrow displacement may also be included and transmitted in a geometry bitstream. In this document, the sampling arrow displacement may be referred to as sampling displacement. According to embodiments, the sampling arrow displacement represents the difference in position between the original point and the sampled point. In other words, the difference in position between the original point and the sampled point may be transmitted in the form of metadata, or the difference in position may be included and transmitted in a geometry bitstream.

In addition, if the sampling scale is 0.25 as shown in FIG. 17(*c*), the precision of all points is reduced by a factor of 0.25 (i.e., ¼). For example, in FIG. 17(*c*), the points of (1, 1) and (2, 1) are original points, and the point of (0, 0) corresponds to a sampled point related to the original points. In this case, the sampling arrow displacement is additionally transmitted as metadata. In other words, the difference in position between each of the original points and the sampled point may be signaled and transmitted in the form of metadata, or the difference in position may also be included and transmitted in a geometry bitstream.

In addition, if the sampling scale is 0.125 as shown in FIG. 17(*d*), the precision of all points is reduced by a factor of 0.125 (i.e., ⅛). For example, in FIG. 17(*d*), the points of (1, 1), (2, 1), (1, 3), and (4, 4), i.e., points 50021 to 50024 are original points, and the point of (0, 0) is a sampled point 50010 related to the original points 50021 to 50024. In this case, the sampling arrow displacement is additionally transmitted as metadata. In other words, the difference in position between each of the original points 50021 to 50024 and the sampled point 50010 may be transmitted in the form of metadata, or the difference in position may also be included and transmitted in a geometry bitstream.

Figure 18:
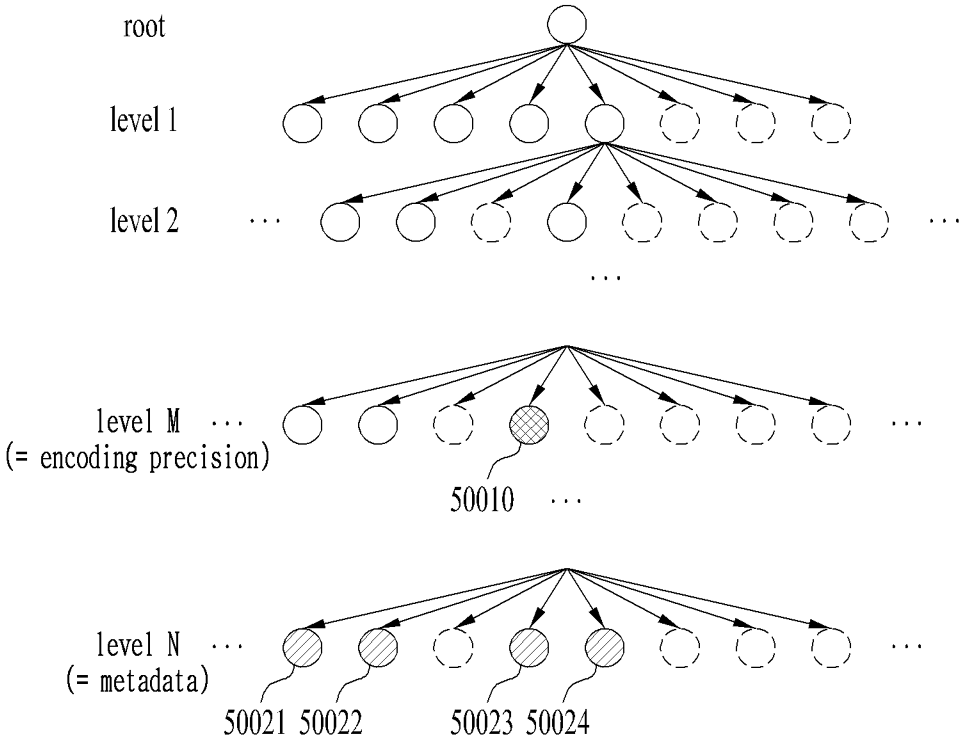
FIG. 18 is a diagram illustrating an exemplary octree sampling method and exemplary metadata generation according to embodiments.

FIG. 18 is a diagram illustrating an exemplary octree sampling method and exemplary metadata generation according to embodiments. In FIG. 18, it is assumed that N denotes the precision level for sampling (i.e., leaf nodes) and M denotes the precision level used for lossy compression (i.e., encoding precision). In addition, assuming that the points 50021 to 50024 in FIG. 17(*d*) correspond to nodes 50021 to 50024 at level N in FIG. 18 and lower nodes of a node 50010 at level M in FIG. 18 are a point group consisting of points 50021 to 50024 at level N, the point 50010 in FIG. 17(*d*) corresponds to the point 50010 at level M in FIG. 18. In this case, sampling is performed at level N. In other words, sampling is performed on the leaf nodes (i.e., level N), and octree-based occupancy compression extends up to level M. Therefore, according to the present disclosure, the occupancy from level N to level M is transmitted as metadata. In other words, sampling is performed on the leaf nodes (i.e., level N), and octree-based occupancy compression extends up to level M. Information necessary for levels N to M is transmitted as metadata. In this context, the difference in position (referred to as octree_sampling_residual) from each of the points 50021 to 50024 at level N to the point 50010 at level M is signaled as the metadata.

For octree sampling, the same values as those of the original points are used as shown in FIG. 17(*a*) to FIG. 17(*d*). Even if the sampling scale changes, points at the same positions are selected, and the number of points decreases. In addition, if encoding is applied such that the sampling shown in FIG. 18 has the encoding precision at octree level M, the displacement of arrows may be transmitted as metadata. In this case, the metadata may be provided in the form of a computed matrix. Moreover, single recoloring may be performed on the octree encoded at level M, and the reconstructed point cloud may be used for attribute compression. According to embodiments, the encoder of the transmitting side and the decoder of the receiving side may calculate the sampling displacement according to Equation 8 below, where $a_1$, $a_2$, and $a_3$ denote transmitted values.

$$\begin{bmatrix} r_{x1} & r_{y1} & r_{z1} \\ r_{x2} & r_{y2} & r_{z2} \\ r_{xN} & r_{yN} & r_{zN} \end{bmatrix} \begin{bmatrix} a_1 \\ a_2 \\ a_N \end{bmatrix} \quad \text{[Equation 8]}$$

In Equation 8 above, r denotes a coefficient. When Equation 8 is applied to FIG. 17(*d*), residuals 5021 to 5010: x5021 to x5010, y5021 to y5010, z5021 to z5010 for one point may be obtained based on a formula for metadata transmission. If the residuals are labeled as 'residual 5021', the residuals 5021 to 5024 are individually calculated. The coefficient r, which is used to extract the features of the residuals 5021 to 5024, is organized into a matrix and transmitted from the transmitter to the receiver. In this case, if the transmitter transmits the values of $a_1$, $a_2$, and $a_N$ (except for feature points), the receiver may reconstruct the residuals 5021 to 5024 by calculating the values of $a_1$, $a_2$, and $a_N$ and the matrix of r. In other words, r serves as a coefficient (i.e., feature point) intended to transmit a smaller residual value.

To transmit the difference in position between an original point and a sampled point at the octree level, arithmetic coding may be applied. Specifically, data of $2^{N-M}\times2^{N-M}\times2^{N-M}$ (where N and M correspond to levels N and M in FIG. 18) is transmitted as metadata. In addition, additional metadata is required to represent the nodes 50021 to 50024 at level N at the point 50010 at level M in FIG. 18. The metadata has values within a range of $2^{N-m}\times2^{N-M}\times2^{N-M}$. Due to octree occupancy representation, a range of $2^N\times2^N\times2^N$ is required to represent the root to level N. However, only levels M to N are required for decoding, and thus the required range is $2^{N-M}\times2^{N-M}\times2^{N-M}$. The size of $2^{N-M}\times2^{N-M}\times2^{N-M}$ is the size of metadata before extracting the feature point, while the values of $a_1$, $a_2$, and $a_N$ are signaled as the final metadata after the extraction of the feature point r.

Furthermore, if the geometry is reconstructed with sampled points, the attribute value of a single point may be used for attribute compression. That is, the single recoloring may not only improve the accuracy of attribute values but also enhance the efficiency of attribute compression.

According to the second embodiment described above, the transmitting side operates in the following order: sampling→octree encoding→single recoloring→metadata generation→attribute compression, while the receiving side operates in the following order: octree decoding→metadata reconstruction→attribute decoding.

According to embodiments of the present disclosure, it is possible to determine whether to apply quantization or sampling to input point cloud data and signal the determination.

According to embodiments of the present disclosure, it is possible to determine whether to apply recoloring or single recoloring (i.e., skip recoloring) to the reconstructed geometry and signal the determination.

According to embodiments of the present disclosure, it is possible to determine whether to perform attribute encoding based on recolored attribute values or attribute values obtained from single recoloring (i.e., skipping recoloring) and signal the determination.

According to embodiments of the present disclosure, metadata or previously calculated matrices may be signaled to encode accurate points for octree sampling. According to embodiments of the present disclosure, the difference between quantized and sampled values for each octree level is signaled, and a generated bitstream may be entropy encoded. Additionally, the generated bitstream may be combined with the reconstructed geometry to obtain a decoded geometry value, and the decoded geometry value may have attribute values related to the geometry based on the recoloring process. Whether to use the attribute values based on the reconstructed geometry may be determined and signaled depending on the efficiency of attribute compression. The determination may be made after attribute compression based on the distribution of the attribute values.

The compression-related information described above (including metadata) may be included in at least one of an SPS, GPS, APS, TPS, or geometry slice header.

FIG. 19 is a diagram illustrating another exemplary point cloud transmission device according to embodiments. Elements of the point cloud transmission device shown in FIG. 19 may be implemented by hardware, software, processors, and/or any combination thereof.

According to embodiments, a point cloud transmission device may include a data input unit 51001, a signaling processor 51002, a geometry encoder 51003, an attribute encoder 51004, and a transmission processor 51005.

The geometry encoder 51003 and the attribute encoder 51004 may perform some or all of the above-described operations of the point cloud video encoder 10002 of FIG. 1, the encoding step 20001 of FIG. 2, the point cloud video encoder of FIG. 4, and the point cloud video encoder of FIG. 12.

The data input unit 51001 according to embodiments receives or acquires point cloud data. The data input unit 51001 may perform some or all of the operations of the point cloud video acquisition unit 10001 of FIG. 1 or perform some or all of the operations of the data input unit 12000 of FIG. 12.

The data input unit 51001 outputs the positions of points in the point cloud data to the geometry encoder 51003 and outputs the attributes of the points in the point cloud data to the attribute encoder 51004. The data input unit 51001 outputs parameters to the signaling processor 51002. According to embodiments, the parameters may also be provided to the geometry encoder 51003 and the attribute encoder 51004.

The geometry encoder 51003 performs quantization or sampling of the positions of input points, generates an octree structure based on the quantized points or sampled points, and then perform occupancy compression. In other words, geometry information is compressed. The geometry encoder 51003 performs entropy encoding on the compressed geometry information and outputs the entropy encoded geometry information as a geometry bitstream to the transmission processor 51005.

The geometry encoder 51003 reconstructs the geometry information based on positions changed by the compression and outputs the reconstructed (or decoded) geometry information to the attribute encoder 51004.

The attribute encoder 51004 compresses attribute information based on positions to which geometry encoding is not applied and/or the reconstructed geometry information. In one embodiment, the attribute information may be encoded based on at least one of RAHT coding, LOD-based predictive transform coding, or lifting transform coding. Alternatively, the attribute information may be encoded based on any combination thereof. The attribute encoder 51004 performs entropy encoding on the compressed attribute information and outputs the entropy encoded attribute information as an attribute bitstream to the transmission processor 51005.

The signaling processor 51002 may generate and/or process signaling information (e.g., parameters) required for encoding/decoding/rendering of the geometry and attribute information. Then, the signaling processor 5100 may provide the signaling information to the geometry encoder 51003, attribute encoder 51004, and/or transmission processor 51005. Alternatively, the signaling processor 51002 may also receive signaling information generated by the geometry encoder 51003, attribute encoder 51004, and/or transmission processor 51005. The signaling processor 51002 may also receive feedback information from receiving devices (e.g., head orientation information and/or viewport information) and provide the information to the geometry encoder 51003, attribute encoder 51004, and/or transmission processor 51005.

In this specification, signaling information may be signaled and transmitted in units of parameter sets (e.g., SPS, GPS, APS, TPS (or tile inventory), etc.). Alternatively, the signaling information may be transmitted on a coding unit basis such as slices or tiles (or on a compression or prediction unit basis) for each frame.

Methods/devices according to embodiments may signal relevant information to add/perform operations according to embodiments. Signaling information according to embodiments may be used by transmitting and/or receiving devices.

The transmission processor 51005 may perform operations and/or transmission methods similar or equal to the operations and/or transmission methods of the transmission processor 12012 in FIG. 12. Alternatively, the transmission processor 51005 may perform operations and/or transmission methods similar or equal to the operations and/or transmission methods of the transmitter 10003 in FIG. 1. Since the specific details are described above with reference to FIG. 1 and FIG. 12, the details will be omitted in the following.

The transmission processor 51005 multiplexes a geometry bitstream output from the geometry encoder 51003, an attribute bitstream output from the attribute encoder 51004, and a signaling bitstream output from the signaling processor 51002 into a single bitstream. Then, the transmission processor 51005 transmits the single bitstream as it is. Alternatively, the transmission processor 51005 encapsulates the single bitstream as a file, segment, and so on for transmission. According to an embodiment of the present disclosure, the term "file" refers to an ISO base media file format (ISOBMFF) file format.

According to embodiments, files or segments may be transmitted to receiving devices or stored on digital storage media (e.g., USB, SD, CD, DVD, Blu-ray, HDD, SSD, etc.). According to embodiments, the transmission processor 51005 may communicate with receiving devices via wired or wireless networks such as 4G, 5G, and 6G. The transmission processor 51005 may perform necessary data processing operations depending on network systems (e.g., communication network systems such as 4G, 5G, and 6G). The transmission processor 51005 may also transmit encapsulated data according to the on-demand approach.

According to embodiments, the compression-related information (or information related to compression) may be included not only in the SPS, GPS, APS, and/or TPS but also in geometry data units (referred to as geometry slice bitstreams). The compression-related information may be transmitted by at least one of the signaling processor 51002, geometry encoder 51003, or transmission processor 51005.

FIG. 20 is a detailed block diagram illustrating the geometry encoder 51003 and attribute encoder 51004 according to embodiments. The elements of the geometry encoder illustrated in FIG. 20 may be implemented by hardware, software, processors, and/or combinations thereof.

According to embodiments, the geometry encoder 51003 may include a coordinate transformer 53001, a quantization/sampling determiner and processor 53002, a metadata generator and quantizer 53003, an octree occupancy code generator 53004, a surface model processor 53005, an arithmetic coder 53006, and a geometry reconstructor 53007.

According to embodiments, the attribute encoder 51004 may include a color transform processor 55001, an attribute transform processor 55002, a prediction/lifting/RAHT transform processor 55003, a coefficient quantization processor 55004, and an arithmetic coder 55005.

The coordinate transformer 53001 may support transformation of the coordinate system of point cloud data, such as changing the xyz axes of input points or converting from xyz Cartesian coordinates to spherical coordinates.

The quantization/sampling determiner and processor 53002 may determine whether to perform quantization or sampling of the positions of input points.

In one embodiment, if the quantization/sampling determiner and processor 53002 selects quantization, the metadata generator and quantizer 53003 adjusts the geometry precision to level N-M to perform lossy compression at the maximum depth level of N. The metadata generator and quantizer 53003 quantizes points from level N-M to level N based on the quantization scale and positions modified leaf nodes at level N-M. In other words, the metadata generator and quantizer 53003 divides level N-M by precision, quantizes all points from level N-M to level N, and positions modified leaf nodes at level N-M.

In another embodiment, if the quantization/sampling determiner and processor 53002 selects sampling, the metadata generator and quantizer 53003 performs sampling at the maximum depth level of N based on the sampling scale. In other words, points at level N are selected based on the sampling scale. Additionally, assuming that the precision level (i.e., encoding precision) used for lossy compression is M, additional data on levels from N-M to N is transmitted as metadata. According to embodiments, the additional data includes information (e.g., octree_sampling_residual) necessary for decoding at levels N-M to N. In other words, the additional data may represent the differences in position between original points and sampled points. That is, sampling is performed at leaf nodes, and octree-based occupancy compression is performed up to level M. The information necessary for levels N to M is included and transmitted as metadata in at least one of an SPS, GPS, TPS, APS, or geometry slice header. Alternatively, the necessary information is included and transmitted in a geometry bitstream.

As described above, the position of each quantized point correspond to a position to which one or more original points are mapped (i.e., a position where there is no point in the original point cloud), while the position of each sampled point is the position of one of the original points. In addition, when quantization is performed, information on a relationship between points at level N and points at level M is not signaled. On the other hand, when sampling is performed, information on a relationship between points at level N and points at level M is signaled in the form of metadata. That is, for octree compression, encoding is performed with an occupancy pattern. Thus, when sampling is performed, the occupancy of a lower level (e.g., level N) is transmitted as metadata, instead of being included in the compressed octree.

When quantization is performed by the metadata generator and quantizer 53003, the octree occupancy code generator 53004 creates an octree structure based on the quantized points. When metadata is generated by the metadata generator and quantizer 53003, the octree occupancy code generator 53004 creates an octree structure based on the sampled points. The leaf nodes of the generated octree structure (e.g., nodes at level M in FIG. 18 are represented by occupancy codes. The octree occupancy code generator 53004 may perform operations and/or methods similar or equal to the operations and/or methods of the point cloud video encoder described in FIG. 4 or FIG. 12 (or perform operations and/or methods similar or equal to the operations and/or methods of the octree analyzer 40002 or octree occupancy code generator 12003).

The surface model processor 53005 may perform trisoup geometry encoding that reconstructs the positions of points within a specific region (or node) based on a surface model using voxels. The surface model processor 53005 may perform operations and/or methods similar or equal to the operations and/or methods of the point cloud video encoder described in FIG. 4 or FIG. 12 (or perform operations and/or methods similar or equal to the operations and/or methods of the surface approximation analyzer 40003 or surface model processor 12004).

The arithmetic coder 53006 performs arithmetic coding (e.g., entropy coding) on the outputs of the octree occupancy code generator 53004 and/or surface model processor 53005 and then outputs the coding results in the form of a geometry bitstream. For example, the arithmetic coder 53006 may perform entropy coding on the occupancy codes outputted by the octree occupancy code generator 53004. Moreover, to enhance compression efficiency, the point cloud video encoder may perform intra/inter coding on the occupancy codes. According to embodiments, the receiving device (or point cloud video decoder) reconstructs the octree based on the occupancy codes.

The geometry reconstructor 53007 reconstructs geometry information based on the occupancy codes from the octree occupancy code generator 53004. For example, if the octree structure is generated based on quantized points, the output of the geometry reconstructor 53007 becomes the positions of the quantized points. If the octree structure is generated based on sampled points, the output of the geometry reconstructor 53007 becomes the positions of the sampled points.

The output of the geometry reconstructor 53007 is provided to the attribute transform processor 55002 and/or prediction/lifting/RAHT transform processor 55003 of the attribute encoder 51004.

According to embodiments, the color transform processor 55001 of the attribute encoder 51004 performs color transform coding on color values included in the attributes of points output from the data input unit 51001. The color transform processor 55001 may perform color transform coding based on the reconstructed geometry. For example, the color transform processor 55001 may convert the format of color information (e.g., from RGB to YCbCr). The color transform processor 55001 may perform operations and/or methods similar or equal to the operations and/or methods of the point cloud video encoder described in FIG. 4 or FIG. 12 (e.g., operations and/or methods similar or equal to the operations and/or methods of the color transformer 40006 or color transform processor 12008).

The attribute transform processor 55002 performs recoloring or single recoloring (i.e., skipping recoloring) based on positions to which geometry encoding is not applied and/or the reconstructed geometry.

In one embodiment, if geometry encoding is performed by the geometry encoder 51003, the attribute transform processor 55002 executes the recoloring or single recoloring. According to embodiments, the recoloring is performed based on Equation 6, and the single recoloring is performed based on Equation 7. In other words, the recoloring involves exploring multiple neighboring points of a point input from the geometry reconstructor 53007 based on K-D tree or Morton code, setting the average of the attribute values of the explored neighboring points to the attributes of the input point, and outputting the corresponding value to the prediction/lifting/RAHT transform processor 55003. The single recoloring involves setting the attributes of a representative point among the explored neighboring points to the attributes of the input point and outputting the corresponding value to the prediction/lifting/RAHT transform processor 55003.

In another embodiment, if sampling is performed by the geometry encoder 51003, the attribute transform processor 55002 performs the single recoloring. In other words, since the points input from the geometry reconstructor 53007 are original points, the attributes of the input points are directly output to the prediction/lifting/RAHT transform processor 55003.

The prediction/lifting/RAHT transform processor 55003 may encode the attributes output from the attribute transform processor 55002 based on at least one of RAHT coding, LOD-based predictive transform coding, lifting transform coding, or any combination thereof. The prediction/lifting/RAHT transform processor 55003 performs at least one of operations similar or equal to those of the RAHT transform transformer 40008, LOD generator 40009, and lifting transformer 40010 described in FIG. 4 or those of the prediction/lifting/RAHT transform processor 12010 described in FIG. 12. Since the details of LOD-based predictive transform coding, lifting transform coding, and RAHT coding are described above with reference to FIGS. 1 to 9, the details will be omitted in the following.

The attributes attribute-coded from the prediction/lifting/RAHT transform processor 55003 may be quantized by the coefficient quantization processor 55004 based on coefficients.

The arithmetic coder 55005 encodes the quantized attributes based on arithmetic coding and outputs the attributes in the form of an attribute bitstream.

The geometry bitstream output from the arithmetic coder 53006 of the geometry encoder 51003 and the attribute bitstream output from the arithmetic coder 55005 of the attribute encoder 51004 are input into the transmission processor 51005.

According to embodiments, the transmission processor 51005 may perform operations and/or transmission methods similar or equal to the operations and/or transmission methods of the transmission processor 12012 in FIG. 12 or perform operations and/or transmission methods similar or equal to the operations and/or transmission methods of the transmitter 10003 in FIG. 1. Since the specific details are described above with reference to FIG. 1 and FIG. 12, the details will be omitted in the following.

According to embodiments, the transmission processor 51005 may transmit the geometry bitstream output from the geometry encoder 51003, the attribute bitstream output from the attribute encoder 51004, and the signaling bitstream output from the signaling processor 51002 separately. Alternatively, the transmission processor 51005 may also multiplex and transmit these streams as a single bitstream.

According to embodiments, the transmission processor 51005 may encapsulate the bitstreams into a file or segment (e.g., streaming segment) and transmit the file or segment through various networks, such as broadcasting networks and/or broadband networks.

According to embodiments, the signaling processor 51002 may generate and/or process signaling information and output the signaling information in the form of a bitstream to the transmission processor 51005. The signaling information generated and/or processed by the signaling processor 51002 may be provided to the geometry encoder 51003, attribute encoder 51004, and/or transmission processor 51005 for the purposes of geometry encoding, attribute encoding, and transmission processing, respectively. Alternatively, the signaling processor 51002 may receive signaling information generated by the geometry encoder 51003, attribute encoder 51004, and/or transmission processor 51005.

In this specification, signaling information may be signaled and transmitted in units of parameter sets (e.g., SPS, GPS, APS, TPS (or tile inventory), etc.). Alternatively, the signaling information may be transmitted on a coding unit basis such as slices or tiles for each frame. In addition, the signaling information may include compression-related information (or information related to compression) which includes metadata. Depending on the application, the signaling information may also be defined at the system level such as file formats, Dynamic Adaptive Streaming over HTTP (DASH), MPEG Media Transport (MMT), etc. or at the hardware (wired) interface level such as (High Definition Multimedia Interface (HDMI), Display Port, Video Electronics Standards Association (VESA), CTA (Consumer Technology Association), etc.

Methods/devices according to embodiments may signal relevant information to add/perform operations according to embodiments. Signaling information according to embodiments may be used by transmitting and/or receiving devices.

FIG. 21 is a diagram showing another exemplary point cloud reception device according to embodiments.

The point cloud reception device according to the embodiments may include a reception processor 61001, a signaling processor 61002, a geometry decoder 61003, an attribute decoder 61004, and a post-processor 61005. According to embodiments, the geometry decoder 61003 and the attribute decoder 61004 may be referred to as a point cloud video decoder. According to embodiments, the point cloud video decoder may be referred to as a PCC decoder, a PCC decoding unit, a point cloud decoder, a point cloud decoding unit, or the like.

The reception processor 61001 according to the embodiments may receive a single bitstream, or may receive a geometry bitstream, an attribute bitstream, and a signaling bitstream, respectively. When a file and/or segment is received, the reception processor 61001 according to the embodiments may decapsulate the received file and/or segment and output the decapsulated file and/or segment as a bitstream.

When the single bitstream is received (or decapsulated), the reception processor 61001 according to the embodiments may demultiplex the geometry bitstream, the attribute bitstream, and/or the signaling bitstream from the single bitstream. The reception processor 61001 may output the demultiplexed signaling bitstream to the signaling processor 61002, the geometry bitstream to the geometry decoder 61003, and the attribute bitstream to the attribute decoder 61004.

When the geometry bitstream, the attribute bitstream, and/or the signaling bitstream are received (or decapsulated), respectively, the reception processor 61001 according to the embodiments may deliver the signaling bitstream to the signaling processor 61002, the geometry bitstream to the geometry decoder 61003, and the attribute bitstream to the attribute decoder 61004.

The signaling processor 61002 may parse signaling information, for example, information contained in the SPS, GPS, APS, TPS, metadata, or the like from the input signaling bitstream, process the parsed information, and provide the processed information to the geometry decoder 61003, the attribute decoder 61004, and the post-processor 61005. In another embodiment, signaling information contained in the geometry slice header and/or the attribute slice header may also be parsed by the signaling processor 61002 before decoding of the corresponding slice data. That is, when the point cloud data is partitioned into tiles and/or slices at the transmitting side, the TPS includes the number of slices included in each tile, and accordingly the point cloud video decoder according to the embodiments may check the number of slices and quickly parse the information for parallel decoding.

Accordingly, the point cloud video decoder according to the present disclosure may quickly parse a bitstream containing point cloud data as it receives an SPS having a reduced amount of data. The reception device may decode tiles upon receiving the tiles, and may decode each slice based on the GPS and APS included in each tile. Thereby, decoding efficiency may be maximized.

That is, the geometry decoder 61003 may reconstruct the geometry by performing the reverse process of the operation of the geometry encoder 51003 of FIG. 19 on the compressed geometry bitstream based on signaling information (e.g., geometry related parameters). The geometry restored (or reconstructed) by the geometry decoder 61003 is provided to the attribute decoder 61004. The attribute decoder 61004 may restore the attribute by performing the reverse process of the operation of the attribute encoder 51004 of FIG. 19 on the compressed attribute bitstream based on signaling information (e.g., attribute related parameters) and the reconstructed geometry. According to embodiments, when the point cloud data is partitioned into tiles and/or slices at the transmitting side, the geometry decoder 61003 and the attribute decoder 61004 perform geometry decoding and attribute decoding on a tile-by-tile basis and/or slice-by-slice basis.

FIG. 22 is a detailed block diagram illustrating the geometry decoder 61003 and the attribute decoder 61004 according to embodiments.

In FIG. 22, the geometry decoder 61003 may include an arithmetic decoder 63001, an occupancy code-based octree reconstruction processor 63002, a surface model processor 63003, a metadata reconstructor 63004, a geometry reconstructor 63005, and a coordinate inverse transformer 63006. The arithmetic decoder 63001, occupancy code-based octree reconstruction processor 63002, surface model processor 63003, geometry reconstructor 63005, and coordinate inverse transformer 63006 in FIG. 22 may perform some or all of the operations of the arithmetic decoder 11000, octree synthesizer 11001, surface approximation synthesizer 11002, geometry reconstructor 11003, and coordinate inverse transformer 11004 in FIG. 11. Alternatively, the arithmetic decoder 63001, occupancy code-based octree reconstruction processor 63002, surface model processor 63003, geometry reconstructor 63005, and coordinate inverse transformer 63006 in FIG. 22 may perform some or all of the operations of the arithmetic decoder 13002, occupancy code-based octree reconstruction processor 13003, surface model processor, and inverse quantization processor 13005 in FIG. 13.

That is, the arithmetic decoder 63001 may perform arithmetic decoding on an input geometry bitstream.

The occupancy code-based octree reconstruction processor 63002 may reconstruct an octree by obtaining occupancy codes from the arithmetic-decoded geometry bitstream (or compression-related information obtained from decoding).

When trisoup geometry encoding is applied, the surface model processor 63003 may perform trisoup geometry decoding and related geometry reconstruction (e.g., triangle reconstruction, up-sampling, and voxelization) based on the surface model method.

When receiving metadata that is generated by the geometry encoder 51003 of the transmitting side through sampling and included in a geometry bitstream after arithmetic coding, the metadata reconstructor 63004 may reconstruct the metadata. Alternatively, the metadata reconstructor 63004 may reconstruct the metadata based on compression-related information included in signaling information.

The geometry reconstructor 63005 may regenerate a geometry based on the processed surface model and/or reconstructed metadata.

The geometry reconstructed by the geometry reconstructor 63005 is output to the coordinate inverse transformer 63006 and a prediction/lifting/RAHT transform processor 65003 of the attribute decoder 61004.

The coordinate inverse transformer 63006 may transform coordinates based on the reconstructed geometry and then obtain the positions (i.e., position values) of points.

The positions obtained from the coordinate inverse transformer 63006 of the geometry decoder 61003 are output to the post-processor 61005.

According to embodiments, if compression-related information (or metadata) is transmitted in at least one of an SPS, GPS, APS, TPS, or geometry slice header, the signaling processor 61002 may obtain the compression-related information and provide the compression-related information to the geometry decoder 61003. Alternatively, the geometry decoder 61003 may directly obtain the compression-related information.

According to embodiments, the attribute decoder 61004 may include an arithmetic decoder 65001, an inverse quantization processor 65002, a prediction/lifting/RAHT transform processor 65003, an attribute reconstructor 65004, and a color inverse transform processor 65005.

According to embodiments, the arithmetic decoder 65001 may perform arithmetic decoding on an input attribute bitstream. The arithmetic decoder 65001 performs operations and/or decoding similar or equal to the operations and/or decoding of the arithmetic decoder 11005 in FIG. 11 or the arithmetic decoder 13007 in FIG. 13.

The inverse quantization processor 65002 inversely quantizes the arithmetic-decoded attribute bitstream and outputs the inverse quantized attributes (or attribute values). Inverse quantization may be optionally applied based on the attribute encoding of the point cloud video encoder.

The prediction/lifting/RAHT transform processor 65003 may decode the attributes output from the inverse quantization processor 65002 using at least one of the RAHT decoding, LOD-based predictive transform decoding, and lifting transform decoding or by combining two or more of the RAHT decoding, LOD-based predictive transform decoding, and lifting transform decoding based on the reconstructed geometry.

The attribute reconstructor 65004 reconstructs the attributes decoded by the prediction/lifting/RAHT transform processor 65003.

The color inverse transform processor 65005 performs inverse transform coding to inversely transform color values (or textures) included in the reconstructed attributes and outputs the results to the post-processor 61005. The color inverse transform processor 65005 performs operations and/or inverse transform coding that are the same as or similar to the operations and/or inverse transform coding of the color inverse transformer 11010 in FIG. 11 or the color inverse transform processor 13010 in FIG. 13.

The post-processor 61005 may reconstruct the point cloud data by matching the positions restored and output from the geometry decoder 61003 with the attributes restored and output from the attribute decoder 61004. The reconstructed point cloud data may then be rendered through a display. In addition, if the reconstructed point cloud data is on a tile and/or slice basis, the post-processor 61005 may perform an inverse process for spatial partitioning of the transmitting side based on signaling information.

Figure 23:
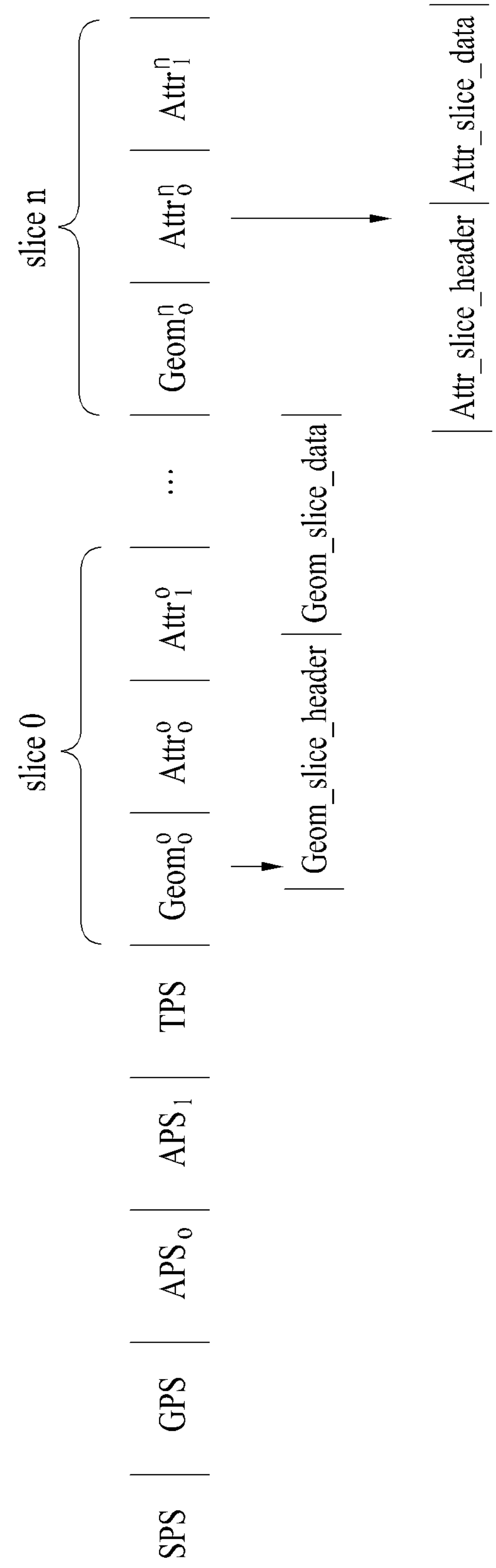
FIG. 23 illustrates an exemplary bitstream structure of point cloud data for transmission and reception according to embodiments.

FIG. 23 illustrates an exemplary bitstream structure of point cloud data for transmission and reception according to embodiments.

To add or implement the above-described embodiments, relevant information may be signaled. According to embodiments, signaling information may be used by the point cloud video encoder of the transmitting side or the point cloud video decoder of the receiving side.

According to embodiments, the point cloud video encoder may encode geometry information and attribute information as described above to generate a bitstream as shown in FIG. 23. Additionally, signaling information on the point cloud data may be generated and processed by at least one of a geometry encoder, an attribute encoder, and a signaling processor in the point cloud video encoder and then be included in the bitstream.

According to embodiments, the signaling information may be received/acquired by at least one of a geometry decoder, an attribute decoder, and a signaling processor in the point cloud video decoder.

According to embodiments, the bitstream may include a geometry bitstream, an attribute bitstream, and a signaling bitstream, which may be transmitted or received separately. Alternatively, these bitstreams may be combined into a single bitstream and then transmitted/received.

When a geometry bitstream, an attribute bitstream, and a signaling bitstream according to embodiments are configured as one bitstream, the bitstream may include one or more sub-bitstreams. The bitstream according to the embodiments may include a sequence parameter set (SPS) for sequence level signaling, a geometry parameter set (GPS) for signaling of geometry information coding, one or more attribute parameter sets (APSs) ($APS_0$, $APS_1$) for signaling of attribute information coding, a tile parameter set (TPS) for tile level signaling, and one or more slices (slice 0 to slice n). That is, a bitstream of point cloud data according to embodiments may include one or more tiles, and each of the tiles may be a group of slices including one or more slices (slice 0 to slice n). The TPS according to the embodiments may contain information about each of the one or more tiles (e.g., coordinate value information and height/size information about the bounding box). Each slice may include one geometry bitstream (Geom0) and one or more attribute bitstreams (Attr0 and Attr1). For example, a first slice (slice 0) may include one geometry bitstream ($Geom0^0$) and one or more attribute bitstreams ($Attr0^0$, $Attr1^0$).

A geometry bitstream in each slice (referred to as a geometry slice) may be composed of a geometry slice header (geom_slice_header) and geometry slice data (geom_slice_data). According to embodiments, the geometry bitstream in each slice is referred to as a geometry data unit. The geometry slice header is referred to as a geometry data unit header, and the geometry slice data is referred to as geometry data unit data.

An attribute bitstream in each slice (referred to as an attribute slice) may be composed of an attribute slice header (attr_slice_header) and attribute slice data (attr_slice_data). According to embodiments, the attribute bitstream in each slice is referred to as an attribute data unit. The attribute slice header is referred to as an attribute data unit header, and the attribute slice data is referred to as attribute data unit data.

By transmitting the point cloud data according to the bitstream structure as shown in FIG. 23, the transmission device according to the embodiments may allow the encoding operation to be applied differently according to the importance level, and allow a good-quality encoding method to be used in an important region. In addition, it may support efficient encoding and transmission according to the characteristics of the point cloud data and provide attribute values according to user requirements.

As the reception device according to the embodiments receives the point cloud data according to the bitstream structure as shown in FIG. 23, it may apply different filtering (decoding methods) to the respective regions (divided into tiles or slices) according to the processing capacity of the reception device, rather than using a complex decoding (filtering) method to the entire point cloud data. Thereby, a better image quality may be provided for regions important to the user and appropriate latency may be ensured in the system.

As described above, tiles or slices are provided to divide the point cloud data into the regions for processing. When the point cloud data is divided into the regions, options may be configured to generate different neighboring point sets for each region. Thus, it is allowed to select a method with low complexity but low reliability or a method with high complexity but high reliability.

According to embodiments, at least one of an SPS, GPS, TPS, APS, or geometry slice header may include compression-related information (or information related to compression).

Specifically, signaling (e.g., compression-related information) may have different meanings depending on positions where the signaling is transmitted. If the signaling is defined in the SPS, the signaling may be uniformly applied to the entire sequence. If the signaling is defined in the GPS, it may indicate that the signaling is used for position reconstruction. If the signaling is defined in the APS, it may indicate that the signaling is used for attribute reconstruction. If the signaling is defined in the TPS, it may indicate that the signaling is applied to points within tiles. If the signaling is transmitted at the slice level, it may indicate that the signaling is applied only to slices. In addition, if fields (referred to as syntax elements) defined in the following are capable of being applied not only to a current point cloud data stream but also to multiple point cloud data streams, the signaling may be provided through a higher level concept of parameter set.

According to embodiments, whether recoloring for attribute compression is performed may be signaled in compression-related information, depending on the reconstructed geometry. When no recoloring is performed, that is, when single recoloring is performed, since there is only one attribute value per point, attribute values that exactly match the original point cloud may be compressed. Accordingly, the accuracy of attribute compression, which is affected by geometry reconstruction, may be improved. According to embodiments, whether single recoloring is performed may be signaled in compression-related information, depending on Moltan code generation, distribution of geometry attribute values, similarity of attribute values of neighboring nodes, and distribution of DC coefficients.

The term "field" used for the syntaxes, which will be described in this document, may have the same meaning as the term "parameter" or "element".

FIG. 24 shows an embodiment of a syntax structure of a sequence parameter set (SPS) (seq_parameter_set_rbsp( )) according to the present disclosure. The SPS may include sequence information about a point cloud data bitstream. In particular, in this example, the SPS includes neighbor point selection related option information.

The SPS according to the embodiments may include a profile_idc field, a profile_compatibility_flags field, a level_idc field, an sps_bounding_box_present_flag field, an sps_source_scale_factor field, an sps_seq_parameter_set_id field, an sps_num_attribute_sets field, and an sps_extension_ present_flag field.

The profile_idc field indicates a profile to which the bitstream conforms.

The profile_compatibility_flags field equal to 1 may indicate that the bitstream conforms to the profile indicated by profile_idc.

The level_idc field indicates a level to which the bitstream conforms.

The sps_bounding_box_present_flag field indicates whether source bounding box information is signaled in the SPS. The source bounding box information may include offset and size information about the source bounding box. For example, the sps_bounding_box_present_flag field equal to 1 indicates that the source bounding box information is signaled in the SPS. The sps_bounding_box_present_flag field equal to 0 indicates the source bounding box information is not signaled. The sps_source_scale_factor field indicates the scale factor of the source point cloud.

The sps_seq_parameter_set_id field provides an identifier for the SPS for reference by other syntax elements.

The sps_num_attribute_sets field indicates the number of coded attributes in the bitstream.

The sps_extension_present_flag field specifies whether the sps_extension_data syntax structure is present in the SPS syntax structure. For example, the sps_extension_present_flag field equal to 1 specifies that the sps_extension_data syntax structure is present in the SPS syntax structure. The sps_extension_present_flag field equal to 0 specifies that this syntax structure is not present. When not present, the value of the sps_extension_present_flag field is inferred to be equal to 0.

When the sps_bounding_box_present_flag field is equal to 1, the SPS according to embodiments may further include an sps_bounding_box_offset_x field, an sps_bounding_box_offset_y field, an sps_bounding_box_offset_z field, an sps_bounding_box_scale_factor field, an sps_bounding_box_size_width field, an sps_bounding_box_size_height field, and an sps_bounding_box_size_depth field.

The sps_bounding_box_offset_x field indicates the x offset of the source bounding box in the Cartesian coordinates. When the x offset of the source bounding box is not present, the value of sps_bounding_box_offset_x is 0.

The sps_bounding_box_offset_y field indicates the y offset of the source bounding box in the Cartesian coordinates. When the y offset of the source bounding box is not present, the value of sps_bounding_box_offset_y is 0.

The sps_bounding_box_offset_z field indicates the z offset of the source bounding box in the Cartesian coordinates. When the z offset of the source bounding box is not present, the value of sps_bounding_box_offset_z is 0.

The sps_bounding_box_scale_factor field indicates the scale factor of the source bounding box in the Cartesian coordinates. When the scale factor of the source bounding box is not present, the value of sps_bounding_box_scale_factor may be 1.

The sps_bounding_box_size_width field indicates the width of the source bounding box in the Cartesian coordinates. When the width of the source bounding box is not present, the value of the sps_bounding_box_size_width field may be 1.

The sps_bounding_box_size_height field indicates the height of the source bounding box in the Cartesian coordinates. When the height of the source bounding box is not present, the value of the sps_bounding_box_size_height field may be 1.

The sps_bounding_box_size_depth field indicates the depth of the source bounding box in the Cartesian coordinates. When the depth of the source bounding box is not present, the value of the sps_bounding_box_size_depth field may be 1.

The SPS according to embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension[i] field, an attribute_instance_id[i] field, an attribute_bitdepth[i] field, an attribute_cicp_colour_primaries[i] field, an attribute_cicp_transfer_characteristics[i] field, an attribute_cicp_matrix_coeffs[i] field, an attribute_cicp_video_full_range_flag[i] field, and a known_attribute_label_flag[i] field.

The attribute_dimension[i] field specifies the number of components of the i-th attribute.

The attribute_instance_id[i] field specifies the instance ID of the i-th attribute.

The attribute_bitdepth[i] field specifies the bitdepth of the i-th attribute signal(s).

The attribute_cicp_colour_primaries[i] field indicates chromaticity coordinates of the color attribute source primaries of the i-th attribute.

The attribute_cicp_transfer_characteristics[i] field either indicates the reference optoelectronic transfer characteristic function of the colour attribute as a function of a source input linear optical intensity with a nominal real-valued range of 0 to 1 or indicates the inverse of the reference electro-optical transfer characteristic function as a function of an output linear optical intensity.

The attribute_cicp_matrix_coeffs[i] field describes the matrix coefficients used in deriving luma and chroma signals from the green, blue, and red, or Y, Z, and X primaries.

The attribute_cicp_video_full_range_flag[i] field indicates the black level and range of the luma and chroma signals as derived from E'Y, E'PB, and E'PR or E'R, E'G, and E'B real-valued component signals.

The known_attribute_label_flag[i] field specifies whether a known_attribute_label field or an attribute_label_four_bytes field is signaled for the i-th attribute. For example, the value of the known_attribute_label_flag[i] field equal to 0 specifies that the known_attribute_label field is signaled for the ith attribute. The known_attribute_label_flag[i] field equal to 1 specifies that the attribute_label_four_bytes field is signaled for the ith attribute.

The known_attribute_label[i] field may specify an attribute type. For example, the known_attribute_label[i] field equal to 0 may specify that the i-th attribute is color. The known_attribute_label[i] field equal to 1 specifies that the i-th attribute is reflectance. The known_attribute_label[i] field equal to 2 may specify that the i-th attribute is frame index.

The attribute_label_four_bytes field indicates the known attribute type with a 4-byte code.

In this example, the attribute_label_four_bytes field indicates color when equal to 0 and indicates reflectance when is equal to 1.

According to embodiments, when the sps_extension_present_flag field is equal to 1, the SPS may further include a sps_extension_data_flag field.

The sps_extension_data_flag field may have any value.

FIG. 25 is a diagram illustrating an exemplary syntax structure of a sequence parameter set (SPS) (seq_parameter_set_rbsp( )) including compression-related information according to embodiments.

Referring to 25, the SPS may include a recoloring_skip_flag field, an octree_sampling_location field, a sampling_point_num field, and a reconstructed_geometry_use_flag field.

The recoloring_skip_flag field may indicate whether recoloring is skipped or not. For example, when the value of the recoloring_skip_flag field is true, it may indicate that single recoloring (i.e., skipping recoloring) is performed. When the value of the recoloring_skip_flag field is false, it may indicate that recoloring is performed.

The octree_sampling_location field may indicate the position of points after quantization when quantized values are used for octree coding. Specifically, the octree_sampling_location field may indicate that positions within the cubic region shown in FIG. 16, such as positions of (0, 0, 0) to (1, 1, 1) or a central position of (0.5, 0.5, 0.5), are used for octree quantization. For example, when four bits are allocated to the octree_sampling_location field, if the value of the octree_sampling_location field is 0000, it may indicate that the position of (0, 0, 0) is used for the quantization. If the value of the octree_sampling_location field is 0001, it may indicate that the position of (0, 0, 1) is used for the quantization. If the value of the octree_sampling_location field is 0111, it may indicate that the position of (1, 1, 1) is used for the quantization. If the value of the octree_sampling_location field is 1000, it may indicate that the position of (0.5, 0.5, 0.5) is used for the quantization.

The sampling_point_num field indicates the number of sampled points. For example, referring to FIG. 18, the sampling_point_num field indicates the number of sampled points at level N, which corresponds to the total number of points at level M.

The reconstructed_geometry_use_flag field indicates whether geometry values reconstructed through single recoloring are used for attribute information. For example, if the value of the reconstructed_geometry_use_flag field is true, it may indicate the geometry values reconstructed through single recoloring are used for the attribute information. If the value of the reconstructed_geometry_use_flag field is false, it may indicate that geometry values reconstructed through conventional recoloring are used for the attribute information.

According to embodiments, if the value of the reconstructed_geometry_use_flag field is true, the SPS may include metadata_data_unit( ).

According to embodiments, the SPS may include a loop that iterates as many times as the value of the sampling_point_num field, instead of including metadata_data_unit( ). In one embodiment, the value of i is initialized to 0 and incremented by 1 with each iteration of the loop, and the loop continues until the value of i reaches the value of the sampling_point_num field. The loop may include an octree_sampling_residual [i][3] field and be positioned after the sampling_point_num field.

The octree_sampling_residual [i][3] field represents the difference in position between an i-th sampled point and an original point. The positional difference may be expressed in the form of xyz. For example, the values of x-x', y-y', and z-z' may be represented for each sampled point. Here, xyz represents the position values of the original point, and x'y'z' represents the position values of the sampled point.

FIG. 26 is a diagram illustrating an exemplary syntax structure of metadata_data_unit( ) according to embodiments.

Referring to FIG. 26, metadata_data_unit( ) may include a loop that iterates as many times as the value of the sampling_point_num field. In one embodiment, the value of i is initialized to 0 and incremented by 1 with each iteration of the loop, and the loop continues until the value of i reaches the value of the sampling_point_num field. The loop may include the octree_sampling_residual [i][3] field.

The octree_sampling_residual [i][3] field represents the difference in position between an i-th sampled point and an original point. The positional difference may be expressed in the form of xyz. For example, the values of x-x', y-y', and z-z' may be represented for each sampled point. Here, xyz represents the position values of the original point, and x'y'z' represents the position values of the sampled point.

According to embodiments, the sampling_point_num field may be included in metadata_data_unit( ).

According to embodiments, metadata_data_unit( ) may exist in each parameter set or as a standalone data unit. Additionally, the differences in position between a sampled octree and an original point cloud may be transmitted as metadata, or values substituted by calculation according to embodiments may be transmitted in the form of a bitstream using arithmetic coding.

According to embodiments, metadata_data_unit( ) is also referred to as sampling-related information. The sampling-related information may be included and transmitted in at least one of an SPS, GPS, APS, TPS, or geometry slice header. Alternatively, the sampling-related information may be included and transmitted in a geometry bitstream.

According to embodiments, the compression-related information of FIG. 25 may be included at arbitrary positions in the SPS of FIG. 24.

FIG. 27 shows an embodiment of a syntax structure of the geometry parameter set (GPS) (geometry_parameter_set( )) according to the present disclosure.

According to embodiments, the GPS may include a gps_geom_parameter_set_id field, a gps_seq_parameter_set_id field, a gps_box_present_flag field, a unique_geometry_points_flag field, a neighbour_context_restriction_flag field, an inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, and a gps_extension_present_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

The unique_geometry_points_flag field indicates whether all output points have unique positions. For example, the unique_geometry_points_flag field equal to 1 indicates that all output points have unique positions. The unique_geometry_points_flag field equal to 0 indicates that in all slices that refer to the current GPS, the two or more of the output points may have the same position.

The neighbor_context_restriction_flag field indicates contexts used for octree occupancy coding. For example, the neighbour_context_restriction_flag field equal to 0 indicates that octree occupancy coding uses contexts determined from six neighboring parent nodes. The neighbour_context_restriction_flag field equal to 1 indicates that octree occupancy coding uses contexts determined from sibling nodes only.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_ mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element occupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization.

The log 2_neighbour_avail_boundary field specifies the value of the variable NeighbAvailBoundary that is used in the decoding process as follows:

$$NeighbAvailBoundary = 2^{log2\_neighbour\_avail\_boundary}$$

For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes as follows.

$$TrisoupNodeSize = 1 \ll \text{log2\_trisoup\_node\_size}$$

The gps_extension_present_flag field specifies whether the gps_extension_data syntax structure is present in the GPS syntax structure. For example, gps_extension_present_flag equal to 1 specifies that the gps_extension_data syntax structure is present in the GPS syntax. For example, gps_extension_present_flag equal to 0 specifies that this syntax structure is not present in the GPS syntax.

When the value of the gps_extension_present_flag field is equal to 1, the GPS according to the embodiments may further include a gps_extension_data_flag field.

The gps_extension_data_flag field may have any value. Its presence and value do not affect the decoder conformance to profiles.

FIG. 28 is a diagram illustrating an embodiment of a syntax structure of a geometry parameter set (GPS) (geometry_parameter_set( )) including compression-related information according to embodiments. The name of signaling information may be understood within the scope of the meaning and functionality of the signaling information.

Referring to FIG. 28, the GPS may include a recoloring_skip_flag field, an octree_sampling_location field, a sampling_point_num field, and a reconstructed_geometry_use_flag field.

Since the details of each field are described above with reference to FIG. 25, the details will be omitted to avoid redundancy.

Additionally, the details of metadata_data_unit( ), which is included when the value of the reconstructed_geometry_use_flag field is true, are described above with reference to FIG. 26, the details will be omitted to avoid redundancy.

According to embodiments, the GPS may include a loop that iterates as many times as the value of the sampling_point_num field, instead of including metadata_data_unit( ). In one embodiment, the value of i is initialized to 0 and incremented by 1 with each iteration of the loop, and the loop continues until the value of i reaches the value of the sampling_point_num field. The loop may include an octree_sampling_residual [i][3] field and be positioned after the sampling_point_num field.

The octree_sampling_residual [i][3] field represents the difference in position between an i-th sampled point and an original point. The positional difference may be expressed in the form of xyz. For example, the values of x-x', y-y', and z-z' may be represented for each sampled point. Here, xyz represents the position values of the original point, and x'y'z' represents the position values of the sampled point.

According to embodiments, the compression-related information of FIG. 28 may be included at arbitrary positions in the GPS of FIG. 27.

FIG. 29 shows a syntax structure of a tile parameter set (tile_parameter_set( )) (TPS) according to an embodiment of the present disclosure. According to embodiments, the TPS may be referred to as a tile inventory. The TPS according to the embodiments includes information related to each tile.

The TPS according to the embodiments includes a num_tiles field.

The num_tiles field indicates the number of tiles signaled for the bitstream. When not present, num_tiles is inferred to be 0.

The TPS according to the embodiments includes an iteration statement repeated as many times as the value of the num_tiles field. In an embodiment, i is initialized to 0, and is incremented by 1 each time the iteration statement is executed. The iteration statement is repeated until the value of i becomes equal to the value of the num_tiles field. The iteration statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, and a tile_bounding_box_size_depth[i] field.

The tile_bounding_box_offset_x[i] field indicates the x offset of the i-th tile in the Cartesian coordinates.

The tile_bounding_box_offset_y[i] field indicates the y offset of the i-th tile in the Cartesian coordinates.

The tile_bounding_box_offset_z[i] field indicates the z offset of the i-th tile in the Cartesian coordinates.

The tile_bounding_box_size_width[i] field indicates the width of the i-th tile in the Cartesian coordinates.

The tile_bounding_box_size_height[i] field indicates the height of the i-th tile in the Cartesian coordinates.

The tile_bounding_box_size_depth[i] field indicates the depth of the i-th tile in the Cartesian coordinates.

FIG. 30 is a diagram illustrating an embodiment of a syntax structure of a tile parameter set (TPS) (tile_parameter_set( )) including compression-related information according to embodiments. The name of signaling information may be understood within the scope of the meaning and functionality of the signaling information.

Referring to FIG. 30, the TPS may include a recoloring_skip_flag field, an octree_sampling_location field, a sampling_point_num field, and a reconstructed_geometry_use_flag field.

Since the details of each field are described above with reference to FIG. 25, the details will be omitted to avoid redundancy.

Additionally, the details of metadata_data_unit( ), which is included when the value of the reconstructed_geometry_use_flag field is true, are described above with reference to FIG. 26, the details will be omitted to avoid redundancy.

According to embodiments, the TPS may include a loop that iterates as many times as the value of the sampling_point_num field, instead of including metadata_data_unit( ). In one embodiment, the value of i is initialized to 0 and incremented by 1 with each iteration of the loop, and the loop continues until the value of i reaches the value of the sampling_point_num field. The loop may include an octree_sampling_residual [i][3] field and be positioned after the sampling_point_num field.

The octree_sampling_residual [i][3] field represents the difference in position between an i-th sampled point and an original point. The positional difference may be expressed in the form of xyz. For example, the values of x-x', y-y', and z-z' may be represented for each sampled point. Here, xyz represents the position values of the original point, and x'y'z' represents the position values of the sampled point.

According to embodiments, the compression-related information of FIG. 30 may be included at arbitrary positions in the TPS of FIG. 29.

FIG. 31 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

According to embodiments, the attr_coding_type field equal to 0 may indicate predicting weight lifting as the coding type. The attr_coding_type field equal to 1 may indicate RAHT as the coding type. The attr_coding_type field equal to 2 may indicate fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias[k] field.

lifting_num_pred_nearest_neighbours plus 1 specifies the maximum number of nearest neighbors to be used for prediction. According to embodiments, the value of NumPredNearestNeighbours is set equal to lifting_num_pred_nearest_neighbours.

lifting_search_range_minus1 plus 1 specifies the search range used to determine nearest neighbours to be used for prediction and to build distance-based levels of detail (LODs). The variable LiftingSearchRange for specifying the search range may be obtained by adding 1 to the value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

When the value of the attr_coding_type field is 2, that is, when the coding type indicates fix weight lifting, the APS according to the embodiments may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points.

The lifting_scalability_enabled_flag field equal to 0 specifies that that the attribute decoding process requires the complete octree decode result for the input geometry points.

According to embodiments, when the value of the lifting_scalability_enabled_flag field is FALSE, the APS may further include a lifting_num_detail_levels_minus1 field.

The lifting_num_detail_levels_minus1 field specifies the number of levels of detail for the attribute coding. The variable LevelDetailCount for specifying the number of LODs may be obtained by adding 1 to the value of the lifting_num_detail_levels_minus1 field. (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LODs) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

According to embodiments, when the value of the lifting_scalability_enabled_flag field is FALSE, the APS may further include an iteration statement iterated as many times as the value of the lifting_num_detail_levels_minus1 field. In an embodiment, the index (idx) is initialized to 0 and incremented by 1 every time the iteration statement is executed, and the iteration statement is iterated until the index (idx) is greater than the value of the lifting_num_detail_levels_minus1 field. This iteration statement may include a lifting_sampling_period_minus2 [idx] field when the value of the lifting_lod_decimation_enabled_flag field is TRUE (e.g., 1), and may include a lifting_sampling_distance_squared_scale_minus1 [idx] field when the value of the lifting_lod_regular_sampling_enabled_flag field is FALSE (e.g., 0). Also, when the value of idx is not 0 (idx !=0), a lifting_sampling_distance_squared_offset [idx] field may be further included.

lifting_sampling_period_minus2 [idx] plus 2 specifies the sampling period for the level of detail idx.

lifting_sampling_distance_squared_scale_minus1 [idx] plus 1 specifies the scale factor for the derivation of the square of the sampling distance for the level of detail idx.

The lifting_sampling_distance_squared_offset [idx] field specifies the offset of the derivation of the square of the sampling distance for the level of detail idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, a variable AdaptivePredictionThreshold for specifying a threshold for switching an adaptive predictor selection mode is set equal to the value of the lifting_adaptive_prediction_threshold field (AdaptivePredictionThreshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

According to the embodiments, when the value of the attr_coding_type field is 1, that is, when the attribute coding type is RAHT, the APS may further include a raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. raht_prediction_enabled_flag equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_ prediction_threshold1 field.

The raht_prediction_threshold0 field specifies a threshold to terminate the transform weight prediction from neighbour points.

The raht_prediction_threshold1 field specifies a threshold to skip the transform weight prediction from neighbour points.

The aps_extension_flag field specifies whether the aps_extension_data_flag syntax structure is present in the APS syntax structure. For example, aps_extension_flag equal to 1 indicates that the aps_extension_data syntax structure is present in the APS syntax structure. For example, aps_extension_flag equal to 0 indicates that the aps_extension_data syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

FIG. 32 is a diagram illustrating an embodiment of a syntax structure of an attribute parameter set (APS) (attribute_parameter_set( )) including compression-related information according to embodiments. The name of signaling information may be understood within the scope of the meaning and functionality of the signaling information.

Referring to FIG. 32, the APS may include a recoloring_skip_flag field, an octree_sampling_location field, a sampling_point_num field, and a reconstructed_geometry_use_flag field.

Since the details of each field are described above with reference to FIG. 25, the details will be omitted to avoid redundancy.

Additionally, the details of metadata_data_unit( ), which is included when the value of the reconstructed_geometry_use_flag field is true, are described above with reference to FIG. 26, the details will be omitted to avoid redundancy.

According to embodiments, the APS may include a loop that iterates as many times as the value of the sampling_point_num field, instead of including metadata_data_unit( ). In one embodiment, the value of i is initialized to 0 and incremented by 1 with each iteration of the loop, and the loop continues until the value of i reaches the value of the sampling_point_num field. The loop may include an octree_sampling_residual [i][3] field and be positioned after the sampling_point_num field.

The octree_sampling_residual [i][3] field represents the difference in position between an i-th sampled point and an original point. The positional difference may be expressed in the form of xyz. For example, the values of x-x', y-y', and z-z' may be represented for each sampled point. Here, xyz represents the position values of the original point, and x'y'z' represents the position values of the sampled point.

According to embodiments, the compression-related information of FIG. 32 may be included at arbitrary positions in the APS of FIG. 31.

FIG. 33 shows an embodiment of a syntax structure of a geometry slice bitstream( ) according to the present disclosure.

The geometry slice bitstream (geometry_slice_bitstream ( )) according to the embodiments may include a geometry slice header (geometry_slice_header( )) and geometry slice data (geometry_slice_data( )).

FIG. 34 shows an embodiment of a syntax structure of the geometry_slice_header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to embodiments may include a gsh_geom_parameter_set_id field, a gsh_tile_id field, a gsh_slice_id field, a gsh_max_node_size_log 2 field, a gsh_num_points field, and a byte_alignment( ) field.

When the value of the gps_box_present_flag field included in the GPS is 'true' (e.g., 1), and the value of the gps_gsh_box_log 2_scale_present_flag field is 'true' (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

The gsh_geom_parameter_set_id field specifies the value of the gps_geom_parameter_set_id of the active GPS.

The gsh_tile_id field specifies the value of the tile id that is referred to by the GSH.

The gsh_slice_id specifies id of the slice for reference by other syntax elements.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

The gsh_max_node_size_log 2 field specifies a size of a root geometry octree node.

The gsh_points_number field specifies the number of coded points in the slice.

FIG. 35 is a diagram illustrating an embodiment of a syntax structure of a geometry slice header (geometry_slice_header( )) including compression-related information according to embodiments. The name of signaling information may be understood within the scope of the meaning and functionality of the signaling information.

Referring to FIG. 35, the geometry_slice_header may include a recoloring_skip_flag field, an octree_sampling_location field, a sampling_point_num field, and a reconstructed_geometry_use_flag field.

Since the details of each field are described above with reference to FIG. 25, the details will be omitted to avoid redundancy.

Additionally, the details of metadata_data_unit( ), which is included when the value of the reconstructed_geometry_use_flag field is true, are described above with reference to FIG. 26, the details will be omitted to avoid redundancy.

According to embodiments, the geometry_slice_header may include a loop that iterates as many times as the value of the sampling_point_num field, instead of including metadata_data_unit( ). In one embodiment, the value of i is initialized to 0 and incremented by 1 with each iteration of the loop, and the loop continues until the value of i reaches the value of the sampling_point_num field. The loop may include an octree_sampling_residual [i][3] field and be positioned after the sampling_point_num field.

The octree_sampling_residual [i][3] field represents the difference in position between an i-th sampled point and an original point. The positional difference may be expressed in the form of xyz. For example, the values of x-x', y-y', and z-z' may be represented for each sampled point. Here, xyz represents the position values of the original point, and x'y'z' represents the position values of the sampled point.

According to embodiments, the compression-related information of FIG. 35 may be included at arbitrary positions in the geometry slice header of FIG. 34.

FIG. 36 shows a syntax structure of an attribute slice bitstream( ) according to an embodiment of the present disclosure.

The attribute slice bitstream (attribute_slice_bitstream( )) according to the embodiments may include an attribute slice header (attribute_slice_header( )) and attribute slice data (attribute_slice_data( )).

FIG. 37 shows a syntax structure of an attribute_slice_header (attribute_slice_header( )) according to an embodiment of the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field in the APS is TRUE (e.g., 1), the attribute slice header (attribute_slice_header( )) according to the embodiments may further include an ash_attr_qp_delta_luma field. When the value of attribute_dimension_minus1 [0ash_dimension_minus1] is greater than 0, the attribute slice header may further include an ash_attr_qp_delta_chroma field.

The ash_attr_parameter_set_id field indicates the value of the aps_attr_parameter_set_id field in the current active APS.

The ash_attr_sps_attr_idx field indicates an attribute set in the current active SPS.

The ash_attr_geom_slice_id field indicates the value of the gsh_slice_id field in the current geometry_slice_header.

The ash_attr_qp_delta_luma field indicates a luma delta quantization parameter qp derived from the initial slice qp in the active attribute parameter set.

The ash_attr_qp_delta_chroma field indicates a chroma delta quantization parameter qp derived from the initial slice qp in the active attribute parameter set.

In this regard, the variables InitialSliceQpY and InitialSliceQpC are derived as follows.

$$InitialSliceQpY = \text{aps\_attrattr\_inital\_qp} + \text{ash\_attr\_qp\_delta\_luma}$$

$$InitialSliceQpC = \text{aps\_attrattr\_initial\_qp} + \text{aps\_attr\_chroma\_qp\_offset} + \text{ash\_attr\_qp\_delta\_chroma}$$

The ash_attr_layer_qp_delta_present_flag field indicates whether the ash_attr_layer_qp_delta_luma field and the ash_attr_layer_qp_delta_chroma field are present in the attribute slice header (ASH) for each layer. For example, when the value of the ash_attr_layer_qp_delta_present_flag field is 1, it indicates that the ash_attr_layer_qp_delta_luma field and the ash_attr_layer_qp_delta_chroma field are present in the ASH. When the value is 0, it indicates that the fields are not present.

When the value of the ash_attr_layer_qp_delta_present_flag field is TRUE, the ASH may further include an ash_attr_num_layer_qp_minus1 field.

The ash_attr_num_layer_qp_minus1 field plus 1 indicates the number of layers through which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp specifying the number of layers may be obtained by adding 0 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include a loop iterated as many times as the value of NumLayerQp. In this case, in an embodiment, i may be initialized to 0 and incremented by 1 every time the loop is executed, and the loop incremented until the value of i reaches the value of NumLayerQp. This loop contains an ash_attr_layer_qp_delta_luma[i] field. Also, when the value of the attribute_dimension_minus1[ash_attr_sps_attr_idx] field is greater than 0, the loop may further include an ash_attr_layer_qp_delta_chroma[i] field.

The ash_attr_layer_qp_delta_luma field indicates a luma delta quantization parameter (qp) from InitialSliceQpY in each layer.

The ash_attr_layer_qp_delta_chroma field indicates a chroma delta quantization parameter (qp) from InitialSliceQpC in each layer.

The variables SliceQpY[i] and SliceQpC[i] with i=0 . . . NumLayerQPNumQPLayer−1 are derived as follows.

```
for (i = 0; i<NumLayerQPNumQPLayer; i++) {
SliceQpY[i] = InitialSliceQpY + ash_attr_layer_qp_delta_luma[i]
SliceQpC[i] = InitialSliceQpC + ash_attr_layer_qp_delta_chroma[i]
}
```

When the value of the ash_attr_region_qp_delta_present_flag field is 1, the attribute slice header (attribute_slice_header( )) according to the embodiments indicates that ash_attr_region_qp_delta, region bounding box origin, and size are present in the current attribute_slice_header. When the value of the ash_attr_region_qp_delta_present_flag field is 0, it indicates that the ash_attr_region_qp_delta, region bounding box origin, and size are not present in the current attribute slice header.

That is, when the value of the ash_attr_layer_qp_delta_present_flag field is 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field indicates the z offset of the region bounding box relative to slice origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field indicates delta qp from SliceQpY[i] and SliceQpC[i] of a region specified by the ash_attr_qp_region_box field.

According to embodiments, the variable RegionboxDeltaQp specifying a region box delta quantization parameter is set equal to the value of the ash_attr_region_qp_delta field (RegionboxDeltaQp=ash_attr_region_qp_delta).

Figure 38:
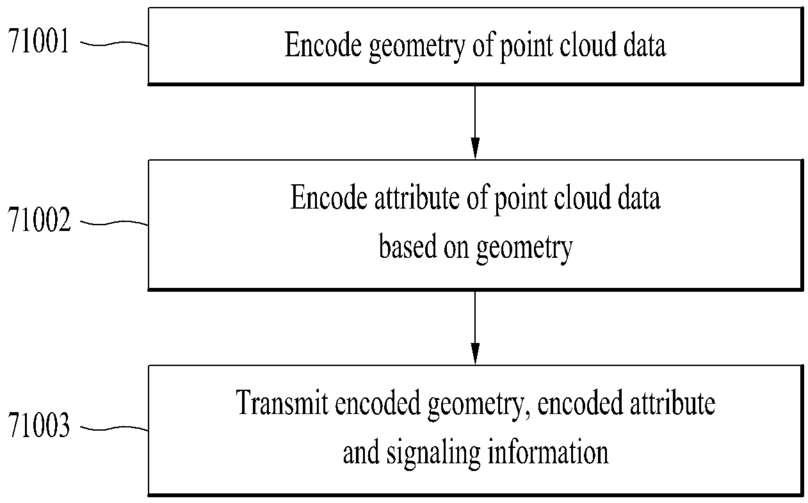
FIG. 38 illustrates a flowchart of a point cloud data transmission method according to embodiments.

FIG. 38 illustrates a flowchart of a point cloud data transmission method according to embodiments.

The point cloud data transmission method according to the embodiments may include: encoding a geometry included in point cloud data (71001); encoding attributes included in the point cloud data based on an input and/or reconstructed geometry (71002); and transmitting a bitstream including the encoded geometry, the encoded attributes, and signaling information (71003).

Encoding the geometry and attributes included in the point cloud data (71001 and 71002) may include some or all of the operations of the point cloud video encoder 10002 of FIG. 1, the encoding step 20001 of FIG. 2, the point cloud video encoder of FIG. 4, the point cloud video encoder of FIG. 12, the geometry encoder and attribute encoder in FIG. 19, and the geometry encoder and attribute encoder in FIG. 20.

According to embodiments, encoding the geometry (71001) involves performing quantization of points of input point cloud data based on a quantization scale or performing sampling of the points of the input point cloud data based on a sampling scale. Subsequently, an octree structure is generated based on the quantized or sampled points, and occupancy codes are entropy encoded and then output in the form of a geometry bitstream. If the octree structure is generated based on the sampled points, sampling displacement (e.g. octree_sampling_residual) is transmitted as metadata. Here, the term "sampling displacement" refers to the difference in position between original and sampled points. The geometry reconstruction used for attribute compression is based on the octree structure generated from either the quantized or sampled points. In this case, the sampled points correspond to one of multiple original points, and thus, the attributes of reconstructed geometry points are directly used for the attribute compression. In other words, a recoloring process is skipped. In this document, skipping the recoloring process is referred to as a single recoloring process. That is, in the single recoloring process, the attributes of the original point cloud are directly used for the attribute compression.

According to embodiments, encoding the attributes (71002) involves performing the attribute compression using the attributes reconstructed by the single recoloring process.

According to embodiments, encoding the geometry and attributes (71001 and 71002) involves performing encoding on a slice basis or on a tile basis, which includes one or more slices.

Transmitting the bitstream including the encoded geometry, encoded attributes, and signaling information (71003) may also be performed by the transmitter 10003 in FIG. 1, the transmission step 20002 in FIG. 2, the transmission processor 12012 in FIG. 12, or the transmission processor 51005 in FIG. 19.

Figure 39:
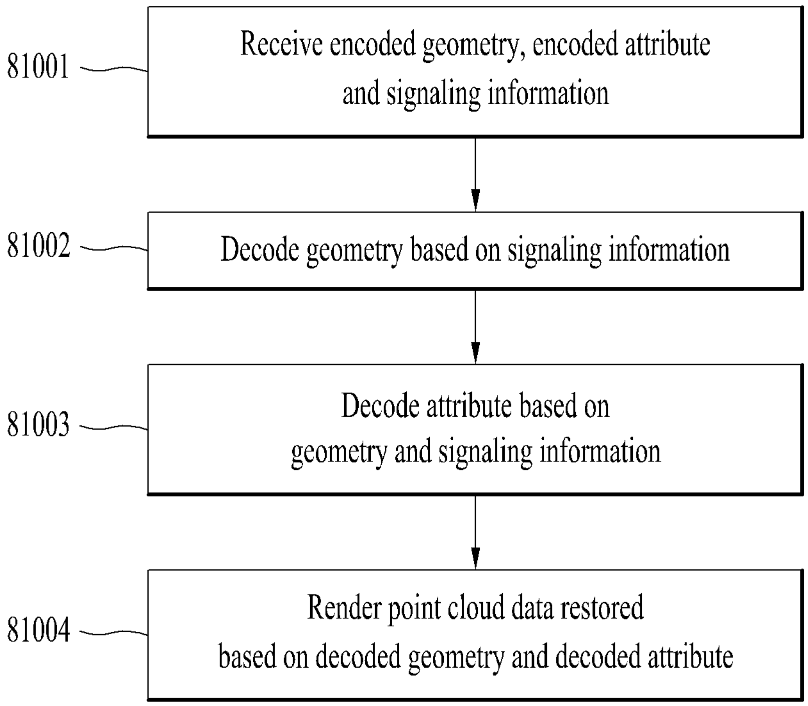
FIG. 39 illustrates a flowchart of a point cloud data reception method according to embodiments.

FIG. 39 illustrates a flowchart of a point cloud data reception method according to embodiments.

According to embodiments, the point cloud data reception method may include receiving a bitstream including an encoded geometry, encoded attributes, and signaling information (81001); decoding the geometry based on the signaling information (81002); decoding the attributes based on the decoded/reconstructed geometry and the signaling information (81003); and rendering reconstructed point cloud data based on the decoded geometry and decoded attributes (81004).

According to embodiments, receiving the bitstream including the encoded geometry, encoded attributes, and signaling information (81001) may be performed by the receiver 10005 in FIG. 1, the transmission step 20002 or decoding step 20003 in FIG. 2, the receiver 13000 or reception processor 13001 in FIG. 13, or the reception processor 61001 in FIG. 21.

According to embodiments, decoding the geometry and attributes (81002 and 81003) may be performed on a slice basis or on a tile basis, which includes one or more slices.

According to embodiments, decoding the geometry (81002) may include some or all of the operations of the point cloud video decoder 10006 in FIG. 1, the decoding step 20003 in FIG. 2, the point cloud video decoder in FIG. 11, the point cloud video decoder in FIG. 13, or the geometry decoder in FIG. 21, or the geometry decoder in FIG. 22.

According to embodiments, decoding the attributes (81003) may include some or all of the operations of the point cloud video decoder 10006 in FIG. 1, the decoding step 20003 in FIG. 2, the point cloud video decoder in FIG. 11, the point cloud video decoder in FIG. 13, the attribute decoder in FIG. 21, or the attribute decoder in FIG. 22.

According to embodiments, signaling information, for example, at least one of an SPS, GPS, APS, TPS, or geometry slice header may include compression-related information. Since the detailed content included in the compression-related information is described above, the detailed content will be omitted to avoid redundancy. According to embodiments, the compression-related information may also be included and received in a geometry bitstream.

According to embodiments, decoding the geometry (81002) involves reconstructing metadata based on the compression-related information and regenerating an octree structure based on the reconstructed metadata to decode the geometry. In addition, the geometry may be reconstructed based on the regenerated octree structure.

According to embodiments, decoding the attributes (81003) may include decoding the attributes based on the reconstructed geometry information.

According to embodiments, rendering the reconstructed point cloud data based on the decoded geometry and decoded attributes (81004) may include rendering the reconstructed point cloud data in various ways. For example, points in point cloud content may be rendered as vertices with a certain spacing, cubes with a specific minimum size centered at the vertices, or circles centered at the corresponding vertices. Some or all of the regions of the rendered point cloud content may be provided to the user through a display (e.g., VR/AR display, general display, etc.).

According to embodiments, rendering the point cloud data (81004) may be performed by the renderer 10007 in FIG. 1, the rendering step 20004 in FIG. 2, or the renderer 13011 in FIG. 13.

In summary, according to the present disclosure, an octree may be generated by quantizing or sampling point cloud data, and attribute compression may be performed based on single recoloring, thereby improving the efficiency of geometry and attribute compression in lossy octree coding. In addition, the signaling defined herein may allow one to select input values for octree coding based on quantization or sampling, and encoding may be performed based on the input information. Furthermore, the point cloud that is reconstructed after being compressed with the octree may provide precise attribute information based on the single recoloring, thereby enhancing the visual quality of attribute values. In particular, since a single value is used in recoloring of the octree, the overall encoding time may be reduced. In other words, no recoloring is applied to the octree, and thus the encoding time may decrease.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module(or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also non-volatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Operations according to the embodiments described in this specification may be performed by a transmission/reception device including one or more memories and/or one or more processors according to embodiments. The one or more memories may store programs for processing/controlling the operations according to the embodiments, and the one or more processors may control various operations described in this specification. The one or more processors may be referred to as a controller or the like. In embodiments, operations may be performed by firmware, software, and/or combinations thereof. The firmware, software, and/or combinations thereof may be stored in the processor or the memory.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Additionally, the operations according to the embodiments described in this document may be performed by transmitting and receiving devices, each of which includes a memory and/or processor, depending on the embodiments. The memory may store programs for processing and controlling the operations according to the embodiments, and the processor may control various operations described in this document. The processor may be referred to as a controller or the like. The operations according to the embodiments may be implemented by firmware, software, and/or combinations thereof, and the firmware, software, and/or combinations thereof may be stored in the processor or memory.

MODE FOR THE DISCLOSURE

The details have been specifically described in the best mode for the disclosure.

INDUSTRIAL APPLICABILITY

It is evident to those skilled in the art that various modifications and variations are possible within the scope of the embodiments without departing from the spirit or scope of the embodiments. Therefore, the embodiments are intended to encompass the modifications and variations of the embodiments provided within the appended claims and their equivalents.

The invention claimed is:

1. A method of encoding point cloud data, the method comprising:
 encoding geometry information including positions of points of the point cloud data;
 encoding attribute information on the points of the point cloud data based on the geometry information; and
 transmitting the encoded geometry information, the encoded attribute information, and signaling information,
 wherein encoding the geometry information comprises:
 quantizing geometry information in original point cloud data;
 generating an octree based on the quantized geometry information; and
 compressing occupancy codes of the octree,
 wherein encoding the attribute information comprises:
  assigning attribute information to each reconstructed point of reconstructed point cloud data generated based on the quantized geometry information;
  compressing the assigned attribute information, and
  wherein assigning the attribute information comprises:
  based on that recoloring is performed, assigning an attribute value to the reconstructed point based on nearest-neighbor relationships including identifying, for each reconstructed point, a set of original points having the reconstructed point as a nearest neighbor based on geometry reconstruction, the set being either empty or including one or multiple original points, and assigning an attribute value to the reconstructed point based on a state of the set; and
  based on that recoloring is not performed, bypassing assigning an attribute value to the reconstructed point based on nearest-neighbor relationships,
  wherein the signaling information includes information related to the assignment of the attribute information, and
  wherein the information related to the assignment includes information for identifying whether recoloring is performed for reconstructed points.

2. The method of claim 1, wherein the attribute value is derived from a single original point nearest to the reconstructed point based on that the set is empty.

3. The method of claim 1, wherein the attribute value is derived by averaging attribute values of the original points included in the set based on that the set includes the one or multiple points.

4. The method of claim 1, wherein the signaling information further includes information related to the quantization of the geometry information.

5. A device for encoding point cloud data, the device comprising:
 a geometry encoder configured to encode geometry information including positions of points of the point cloud data;
 an attribute encoder configured to encode attribute information on the points of the point cloud data based on the geometry information; and
 a transmitter configured to transmit the encoded geometry information, the encoded attribute information, and signaling information,
 wherein the geometry encoder is configured to:
 quantize geometry information in original point cloud data;
 generate an octree based on the quantized geometry information; and
 compress occupancy codes of the octree,
 wherein the attribute encoder is configured to:
 assign attribute information to each reconstructed point of reconstructed point cloud data generated based on the quantized geometry information; and
 compress the assigned attribute information,
 wherein the attribute encoder is further configured to:
 based on that recoloring is performed, assign an attribute value to the reconstructed point based on nearest-neighbor relationships including identifying, for each reconstructed point, a set of original points having the reconstructed point as a nearest neighbor based on geometry reconstruction, the set being either empty or including one or multiple original points, and assign an attribute value to the reconstructed point based on a state of the set; and
 based on that recoloring is not performed, bypass assigning an attribute value to the reconstructed point based on nearest-neighbor relationships,
 wherein the signaling information includes information related to the assignment of the attribute information, and
 wherein the information related to the assignment includes information for identifying whether recoloring is performed for reconstructed points.

6. The device of claim 5, wherein the attribute value is derived from a single original point nearest to the reconstructed point based on that the set is empty.

7. The device of claim 5, wherein the attribute value is derived by averaging attribute values of the original points included in the set based on that the set includes the one or multiple points.

8. The device of claim 5, wherein the signaling information further includes information related to the quantization of the geometry information.

9. A method of decoding point cloud data, the method comprising:
 receiving geometry information, attribute information, and signaling information;
 decoding the geometry information based on the signaling information; and
 decoding the attribute information based on the signaling information and the geometry information,
 wherein the decoded geometry information includes positions of points,
 wherein the decoded attribute information includes attribute values of the points,
 wherein decoding the geometry information comprises dequantizing the geometry information based on the signaling information,
 wherein decoding the attribute information further comprises:
 reconstructing the decoded attribute information by performing an inverse process of an assignment of the attribute information performed at a transmitting side,
 wherein the assignment of the attribute information to each point of the reconstructed point cloud data at the transmitting side comprises:
 based on that recoloring is performed, assigning an attribute value to the reconstructed point based on nearest-neighbor relationships including identifying, for each reconstructed point, a set of original points having the reconstructed point as a nearest neighbor based on geometry reconstruction, the set being either empty or including one or multiple points, and assigning an attribute value to the reconstructed point based on a state of the set; and based on that recoloring is not performed, bypassing assigning an attribute value to the reconstructed point based on nearest-neighbor relationships, wherein the signaling information includes information related to the assignment of the attribute information, and wherein the information related to the assignment includes information for identifying whether recoloring is performed for reconstructed points.

10. The method of claim 9, wherein the attribute value is derived from a single original point nearest to the reconstructed point based on that the set is empty.

11. The method of claim 9, wherein the attribute value is derived by averaging attribute values of the original points included in the set based on that the set includes the one or multiple points.

12. The method of claim 9, wherein the signaling information further includes information related to the quantization of the geometry information.

* * * * *